United States Patent [19]

Holste et al.

[11] Patent Number: 4,621,320

[45] Date of Patent: Nov. 4, 1986

[54] MULTI-USER READ-AHEAD MEMORY

[75] Inventors: Daniel D. Holste, Apple Valley; Lawrence L. Reiners, Eagan, both of Minn.

[73] Assignee: Sperry Corporation, New York, N.Y.

[21] Appl. No.: 544,900

[22] Filed: Oct. 24, 1983

[51] Int. Cl.<sup>4</sup> .................. G06F 12/00; G06F 12/16
[52] U.S. Cl. .................................. 364/200; 365/222
[58] Field of Search ................................ 365/222; 364/200 MS File, 900 MS File

[56] References Cited

U.S. PATENT DOCUMENTS

| | | | |
|---|---|---|---|
| 4,048,623 | 9/1977 | Gruner | 364/200 |
| 4,156,905 | 5/1979 | Fassbender | 364/900 |
| 4,157,587 | 6/1979 | Joyce | 364/200 |
| 4,172,282 | 10/1979 | Aichelmann | 365/222 |
| 4,185,323 | 1/1980 | Johnson | 365/222 |
| 4,292,674 | 9/1981 | Scheuneman | 364/200 |
| 4,357,686 | 11/1982 | Scheuneman | 365/222 |
| 4,424,561 | 1/1984 | Stanley | 364/200 |
| 4,438,493 | 3/1984 | Cushing | 364/200 |
| 4,439,827 | 3/1984 | Wilkes | 364/200 |

Primary Examiner—James D. Thomas
Assistant Examiner—Florin Munteanu
Attorney, Agent, or Firm—Glenn W. Bowen

[57] ABSTRACT

A digital computer memory prefetches, or reads ahead, a next sequential, odd, address data word from a backing memory store containing all such odd address data words to a high speed buffer register simultaneously that the memory fetches the immediately preceding, even address data word from a backing memory store containing all such even address data words to that requestor-user, one of selective one(s) of a multiplicity of such requestor-users with which the memory communicates, which is addressably reading such even address data word. Selective one(s) of the requestor-users, which one(s) is (are) predominantly sequential in successive read addressings, does (do) enable such prefetching through a unique signal communicated to the memory. Remaining requestor-users do disable, via the alternative condition of the same signal, any prefetching; causing thereby no disturbance to the priorly read-ahead, odd address, data word. Any requestor-user may addressably read, necessarily at the odd address, the read-ahead data word from the high speed buffer register at a read response time improved from fetching data words from the backing store. Refreshing of a dynamic random access memory backing store is obtained simultaneously with any such read of the read-ahead data word, thereby reducing the time overhead of such refreshing on the productive availability of the memory.

5 Claims, 25 Drawing Figures

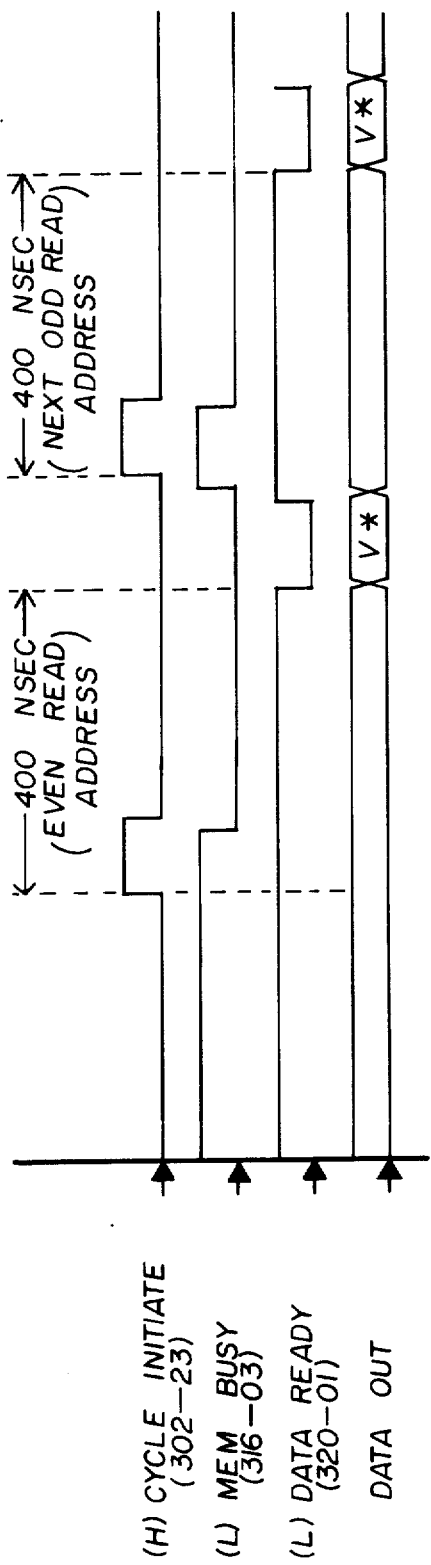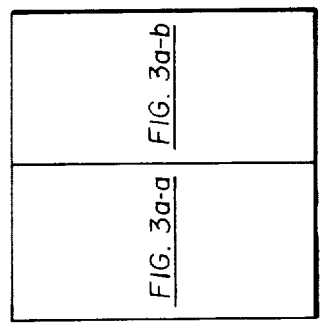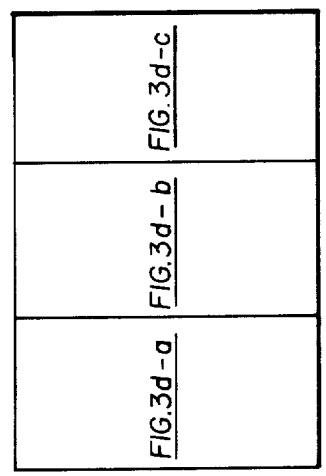

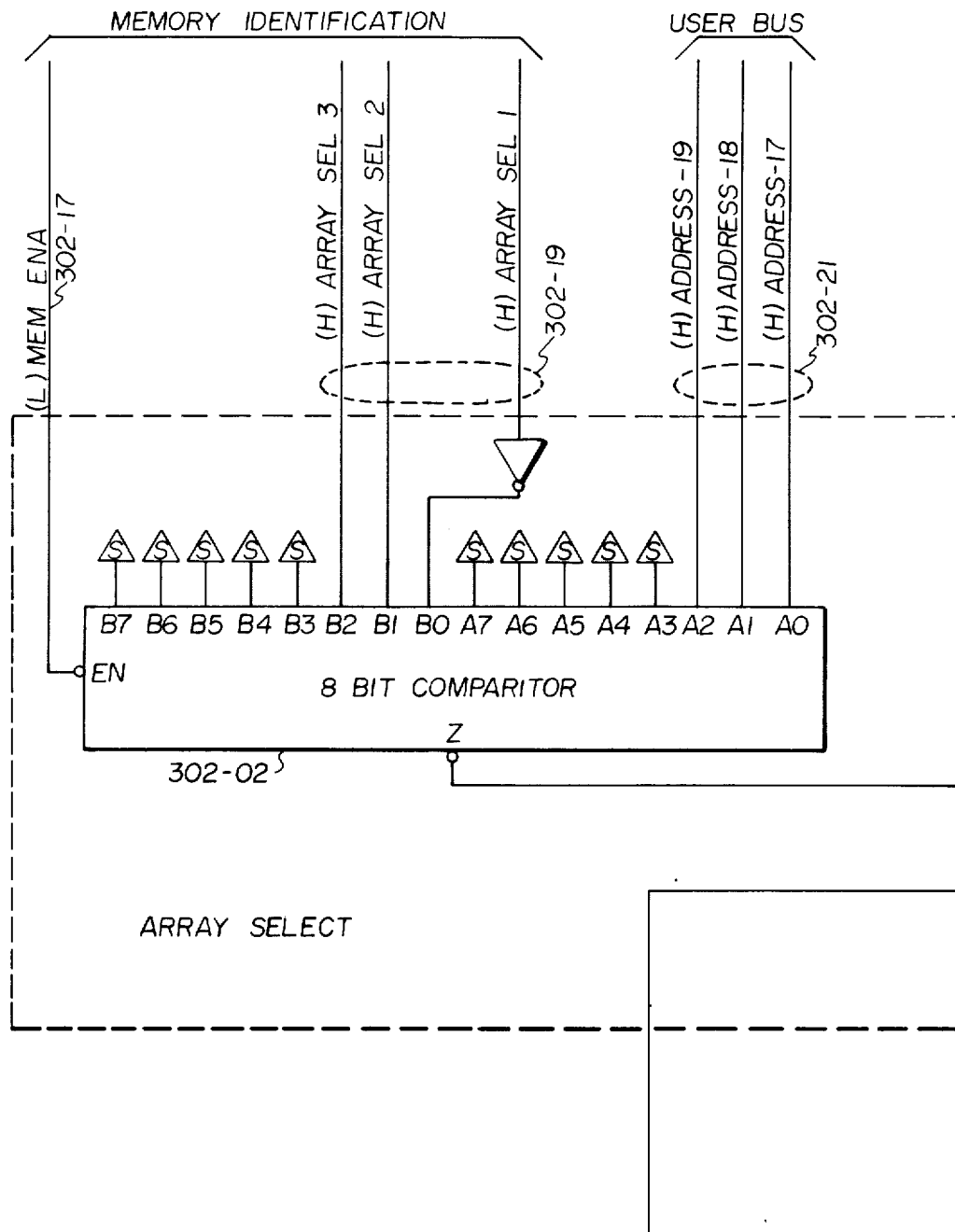
FIG. 3a-a

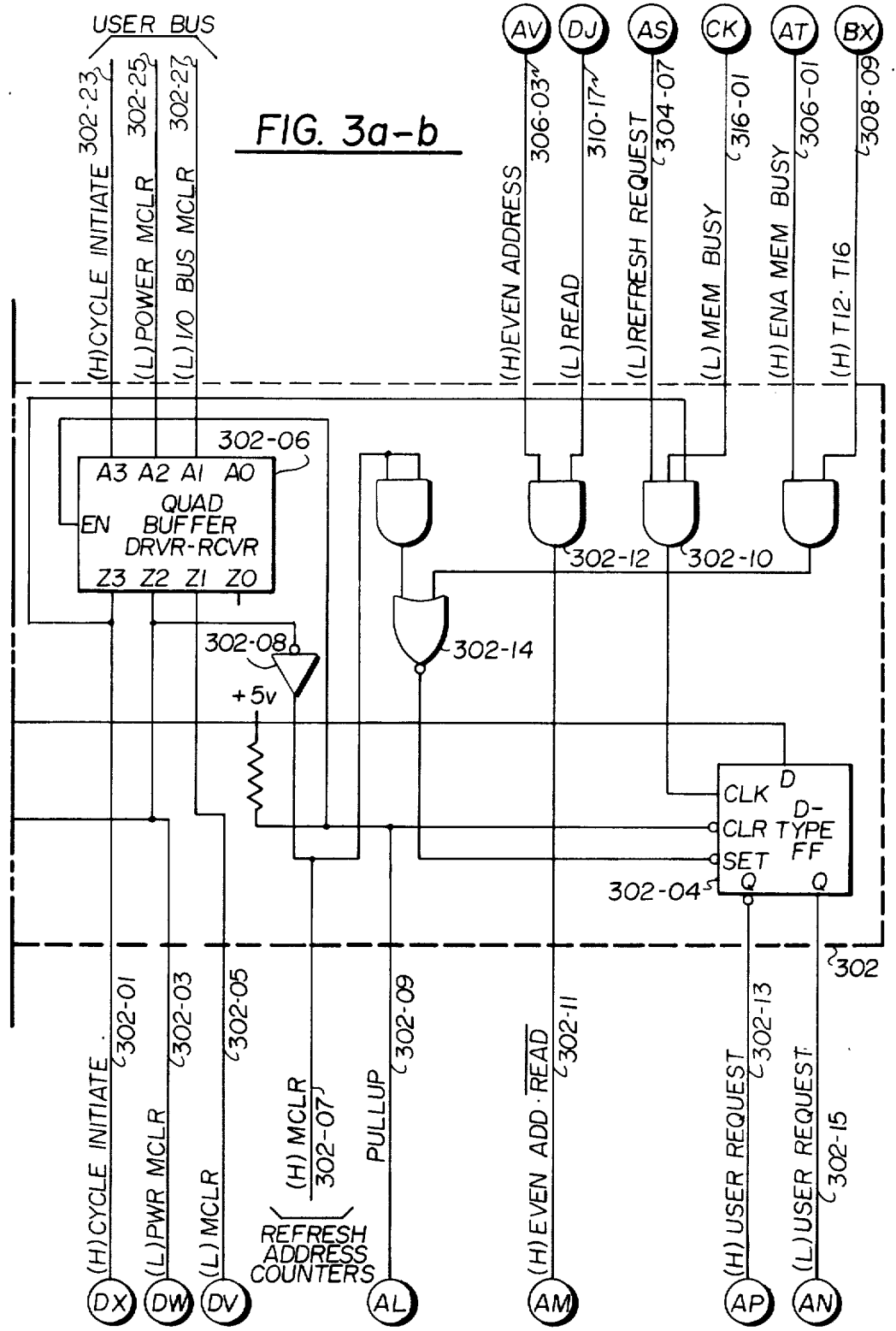
FIG. 3a-b

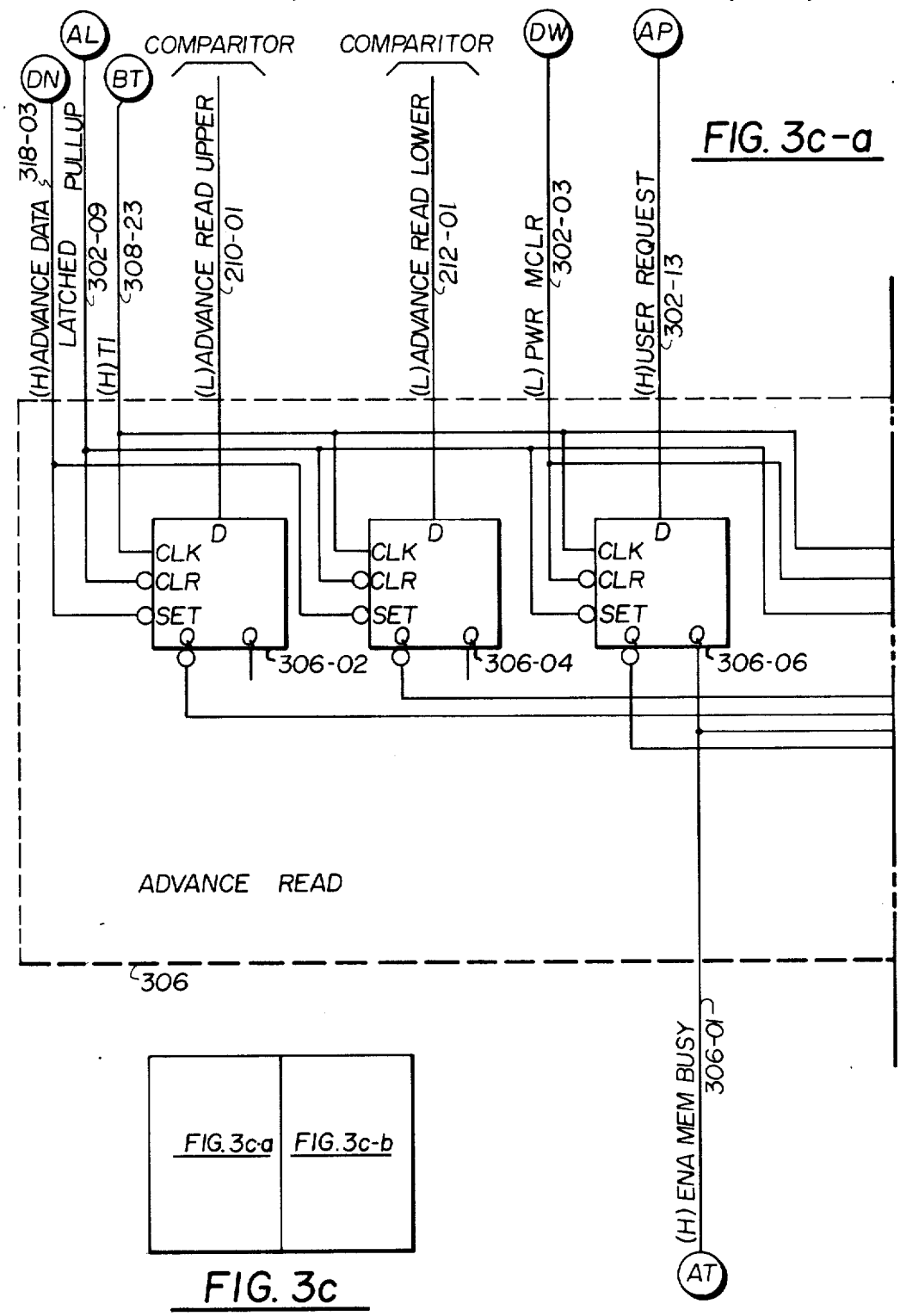

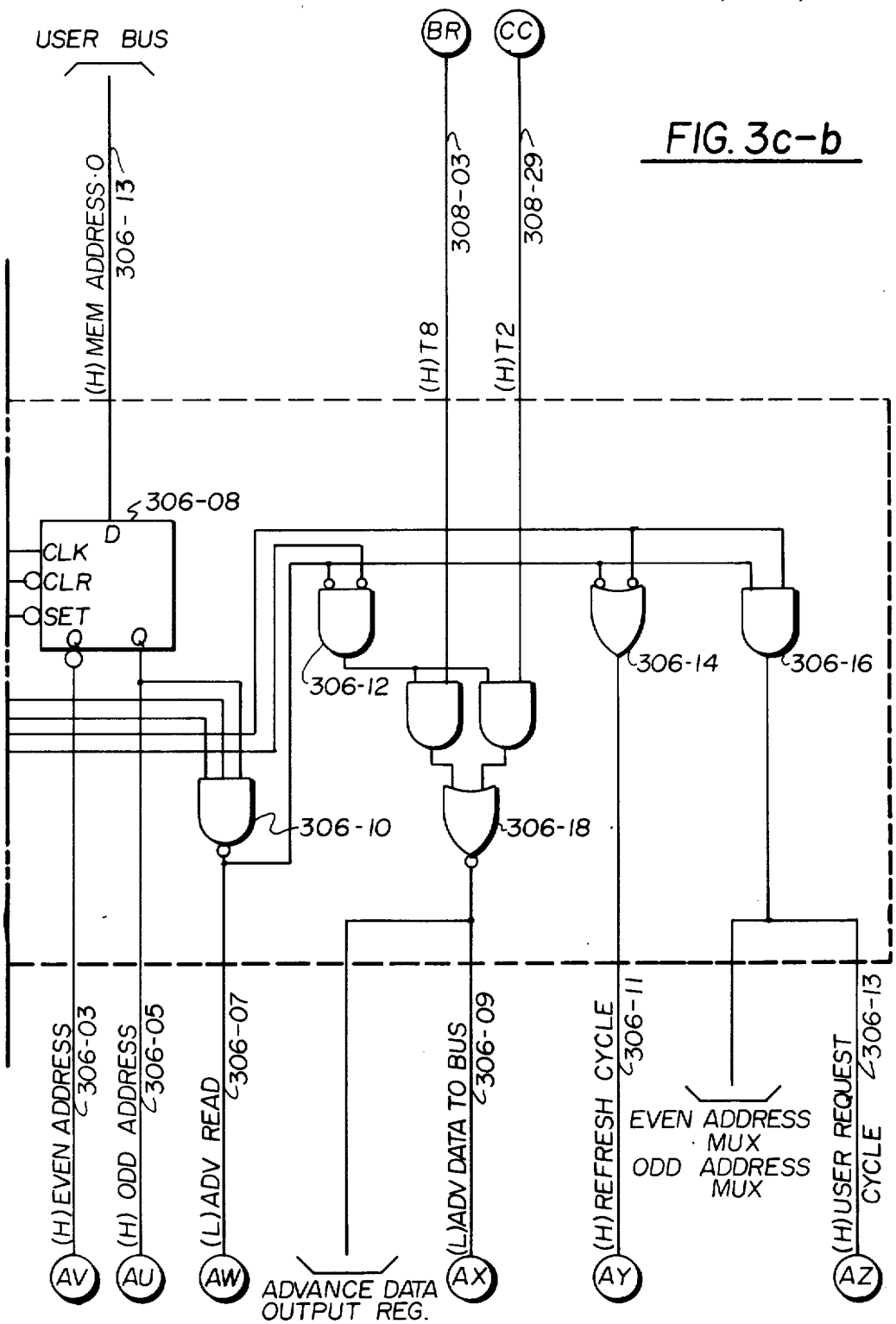
FIG. 3c-b

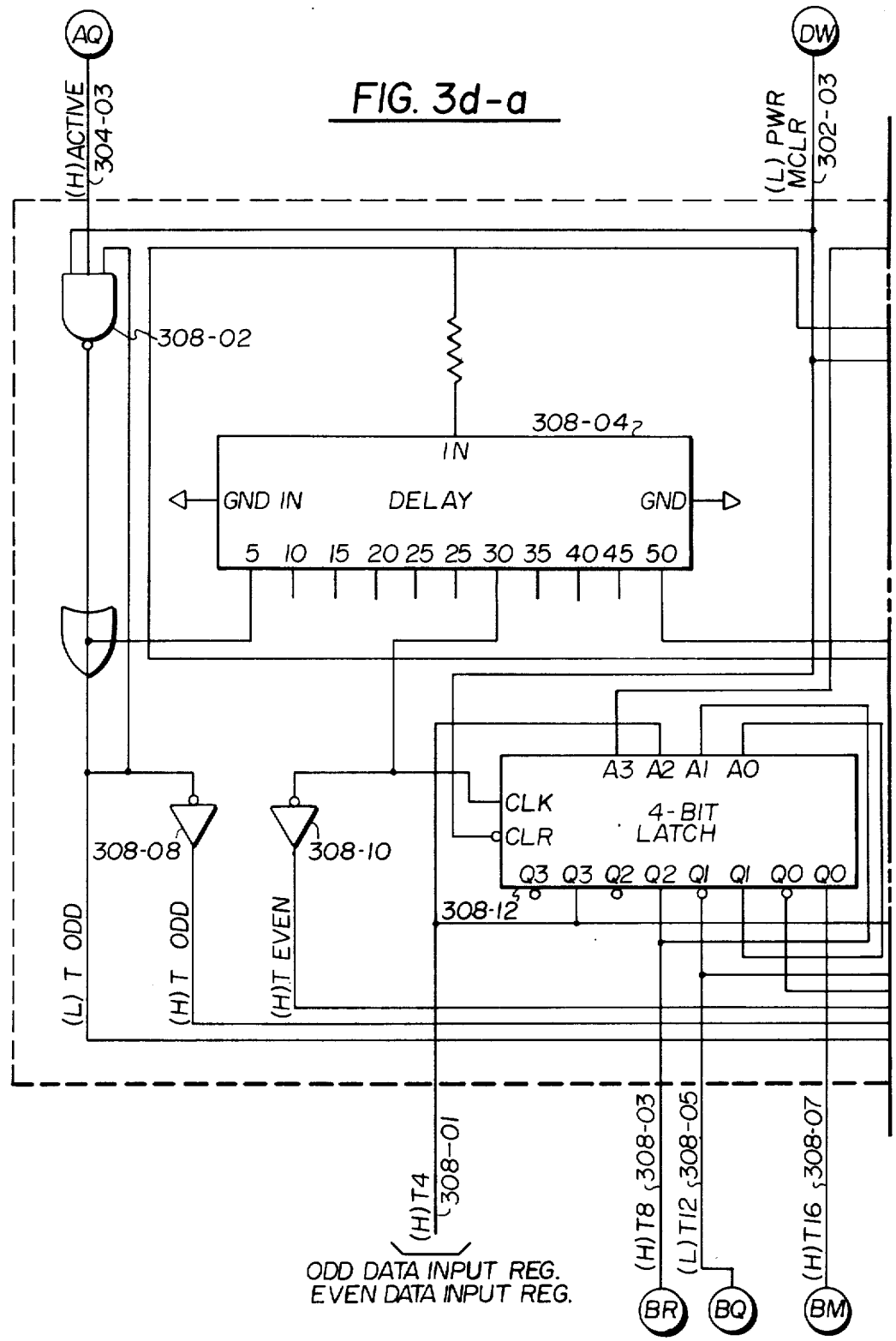
FIG. 3d-a

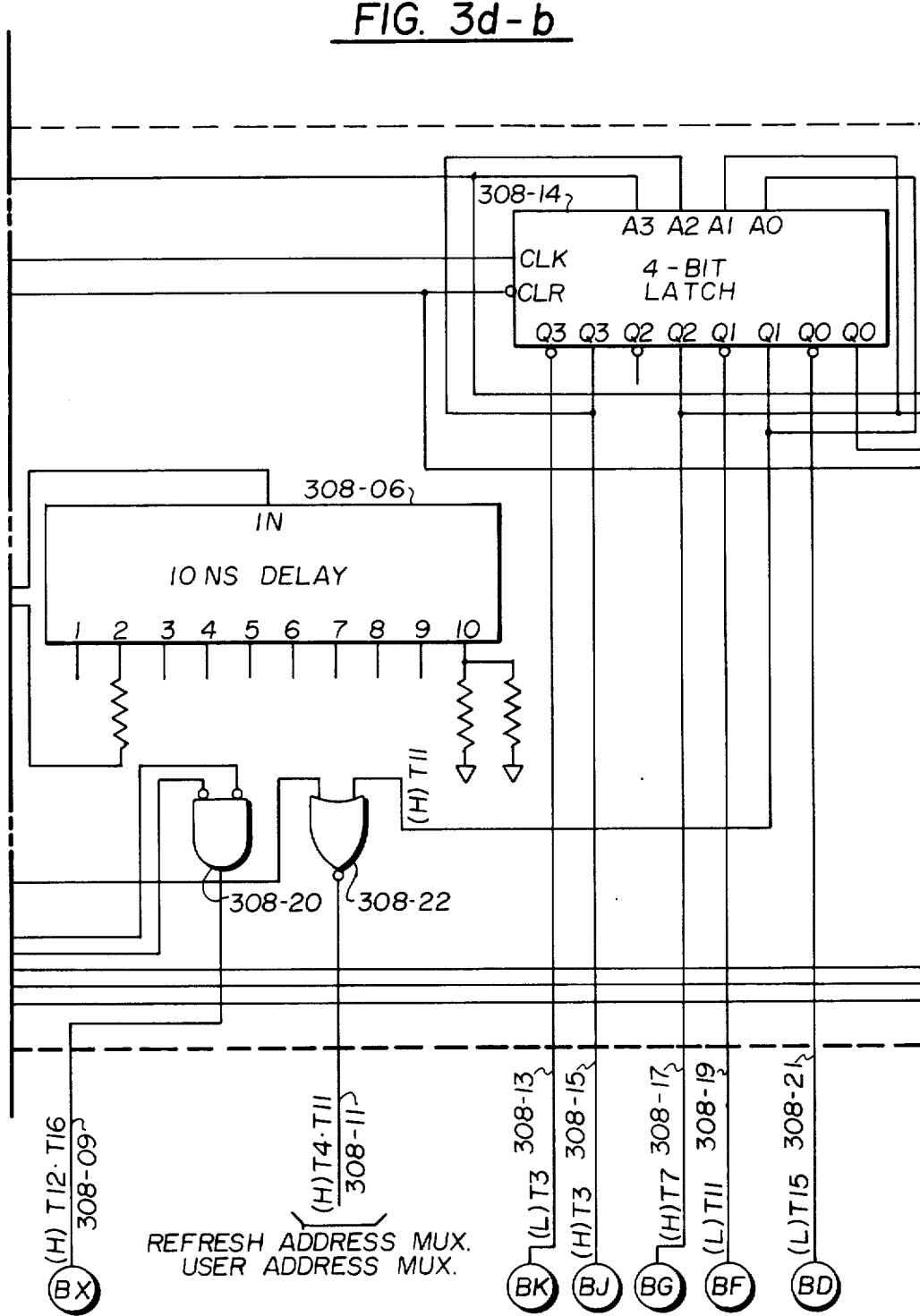
FIG. 3d-b

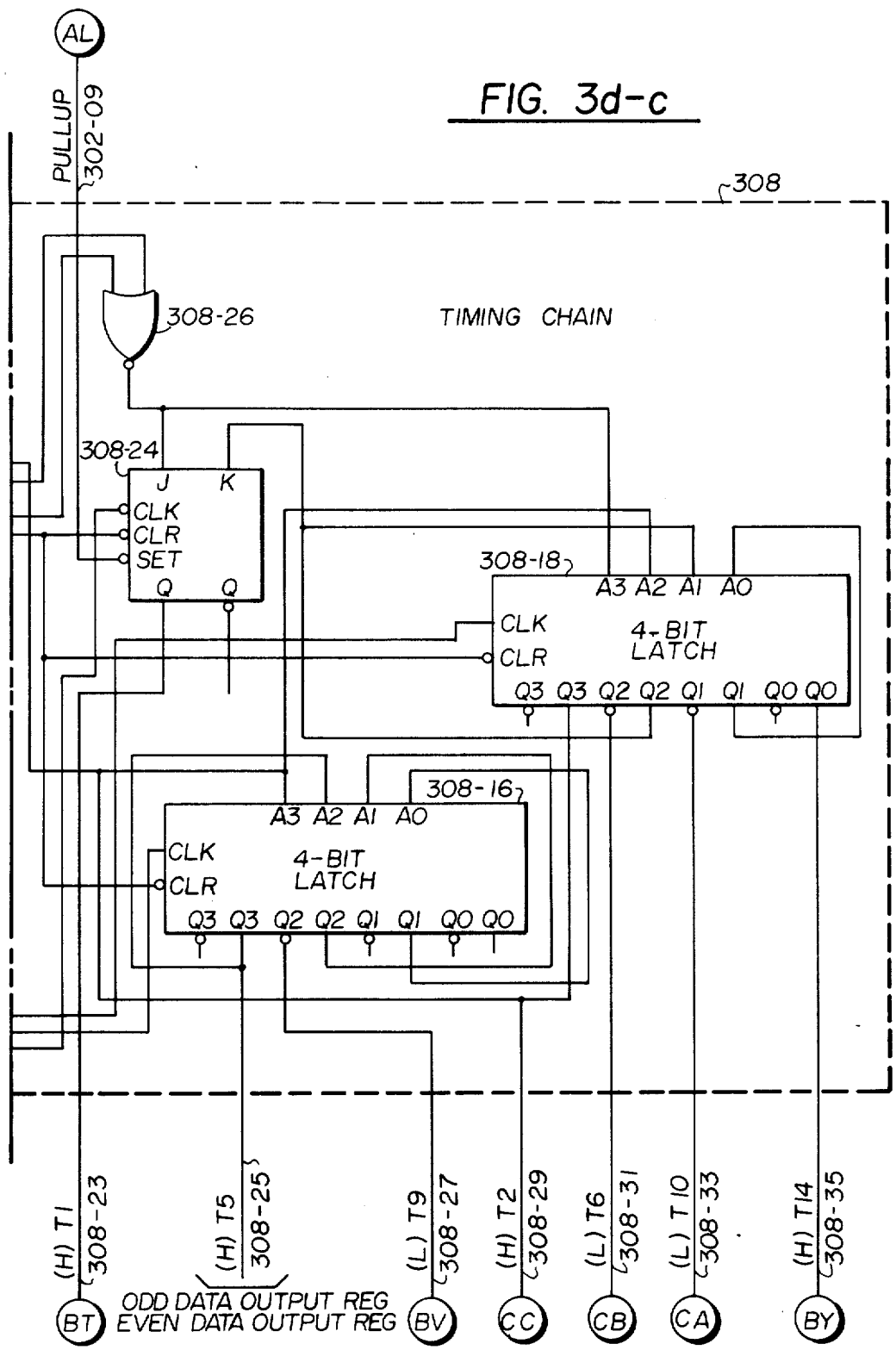
FIG. 3d-c

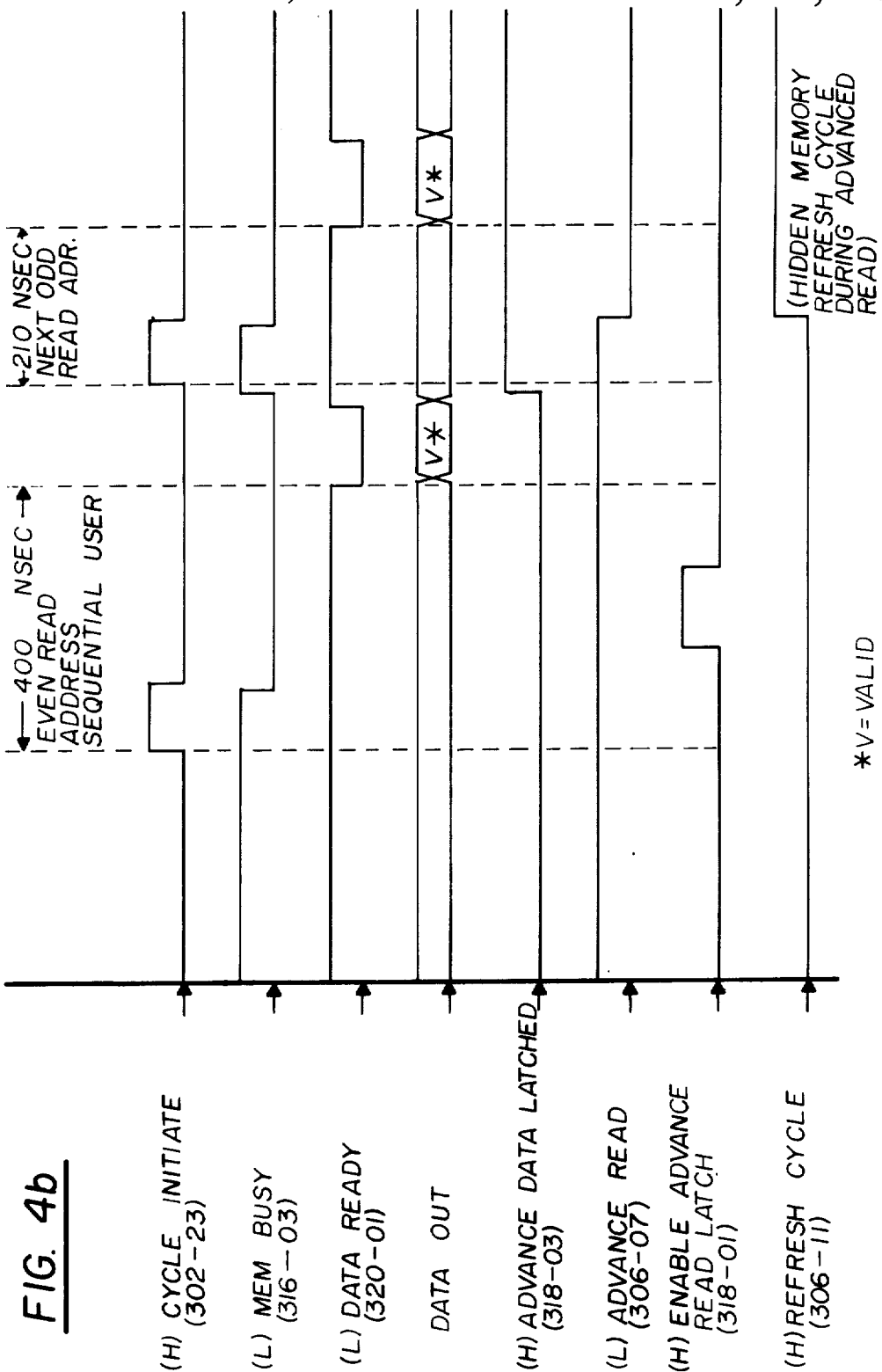

MULTI-USER READ-AHEAD MEMORY

The present invention relates generally to asynchronously timed digital computer memories randomly accessible by a plurality of requestor users of such memories. The present invention relates specifically to a digital memory internally timed and structured to read-ahead, or prefetch data (only), to a selected, predominantly sequential, one of a plurality of requestor users of such memory in order that the effective memory response time upon certain subsequent requests may be beneficially decreased.

Memory systems operate in a generally serial fashion. That is, an asynchronously timed memory unit will handle a request for data at one particular address from one particular requestor, operate upon that request, supply the requested data and then commence to contihue with a next subsequent request. Generally, the first request must be completed before the second request can be initiated. When the computer memory system is a large one, and the memory units are randomly accessible, the access time for a particular word may be significant with respect to the design of the overall operating systems of which the memory units are a part.

Although the present invention is not a cache memory, a preliminary discussion of the goals of prefetching data within the context of cache memory systems will first be undertaken. Buffered, or cache, memories have been developed which attempt to decrease the access time necessary for the request of data words from memory units. Generally, these buffer memory systems try to anticipate future requests for data words by providing a separate, and faster, buffer memory into which are stored those selected data words which the buffer memory system anticipates will be requested in the immediate future. If such data words are subsequently requested, then they will be available from the higher speed stores of the buffer memory without the necessity of going to the backdrop, slower, main memory units. Generally, the data words which are selected for storage in the buffer memory are tied in some fashion to the address of a normal memory request. For example, when one particular data word is requested from main memory, subsequent address ones to the requested data word may be loaded into the buffer memory. Generally, this is accomplished on a page or block, basis in which data words are grouped into pages, or blocks, so that when a data word within a page or block is requested, then all of the data words within that page or block are loaded into the buffer memory wherein they are then available for subsequent memory requests. When a subsequent request occurs to one of the other data words within the page or block, that data can be made available much more quickly from the buffer memory than if such data were not located within such buffer memory.

Many sophisticated algorithms for prefetching data into a buffer, or cache, memory,some of which such algorithms adaptively prefetch along multiple lines, exist. A simplistic algorithm for loading a page, or block, of data words into the buffer memory when one of the data words is requested from the memory unit may be based upon the limited assumption that requests to such memory unit will tend to be somewhat sequential in nature, such sequential nature as results from the general flow of digital computer software programs. If the flow is generally sequential, then the next data word following that data word which has been requested from the memory system will be the most likely candidate for future accesses. As buffer, or cache, memories are increased in size and the number of data words which are prefetched into the buffer memory becomes larger, then the benefit of such prefetching, based on the likelihood that the next request will be a request for one of the cached data words, increases. But such increase is not in direct proportion to the number of data words being added to the buffer, regardless of the sophistication and the multiplicity of the prefetching algorithms (including the sequential algorithm).

Additionally, buffer, or cache, memories are somewhat expensive to construct. The buffer, or cache, memory requires not only randomly accessible memory unit in which data words contained within such buffer memory are stored, but must also include an associative memory which is utilized to determine which of requested data words are present within such buffer memory. Additionally, a buffer, or cache, memory needs perform retrievals in expectation of future requests conditional upon the addresses of current requests.

The present invention of a multi-user read-ahead memory operates within an asynchronously timed memory unit which is accessible by a plurality of requestors, or any cache memories to such requestors. Thus it operates at a different computer system level—within the memory units—than does a buffer, or cache, memory. The purpose of the present invention are, however, similar to that of a cache memory (especially as regards sequential requests) and it is complementary to such cache memories where employed. A prior art structure for enhancing the performance of an asynchronously timed memory unit is taught in U.S. Pat. No. 4,292,674 for a ONE WORD BUFFER MEMORY SYSTEM to James H. Scheuneman. The Scheuneman patent teaches a one word buffer memory store within a memory unit. The buffer store is caused to be entered with the data of the next consecutive address to that address for which, in time overlap, data is currently being communicated to a requestor in response to a request. This is accomplished via a plus one adder included in the Scheuneman memory for incrementing the address contained within an address register, and storing such resultant incremented address in an address plus one register. Then, with the normal memory access completed and the results thereof on the way to the requestor, the memory will utilize the contents of such address plus one register to make another, subsequent, retrieval in time-overlap with this communication of the requested data to the requestor. When a new request occurs, from whatsoever requestor, a comparator circuit will compare the new address requested with the previous contents of the address plus one register and, if such contents match, the data word has already been retrieved and is immediately available. Such data word, having been retrieved in advance, it may be more expeditiously issued to the requestor than if it needs otherwise be obtained from the memory store. If, however, the next address received from whatsoever requestor is not that of the prefetched data, then the randomly addressable memory unit must be re-accessed in the normal manner.

By the reading ahead, or prefetching, of data words the Scheuneman invention makes, as will the present invention, an asynchronously timed memory perform faster, regardless of whether the data retrieved therefrom is being transmitted to a cache memory or to a requestor such as of the central processing unit (CPU) or input output controller (IOC) type. But the apparatus of Scheuneman has the greatest beneficient effect when the internal memory time to access the contents of random access stores, commonly called the "back" end functionality of the memory, is commensurate with the time during which a memory must communicate with a requestor, both to receive the data therefrom and to issue the data thereto, such function as is commonly called the "front" end function of a memory. In prior art magnetic memories, the "back" end function was normally much longer than the "front" end function, making the time-overlap of such functions of little value. Now, with the advent of fast memory stores such as semiconductor memory, the times of retrieval may be commensurate with the times of information communication to requestors, especially if such communication transpires across physically lengthy buses. The apparatus of Scheuneman time-overlaps the "back" end function of a memory with the "front" end function of such memory by causing that, as a "back" end function, a next sequential memory address to that immediately previously referenced will be retrieved from memory stored and stored in a high-speed register. Within such register such data may be more quickly furnished to a requestor upon a latter addressable reference thereto. The present invention will not require time-overlap of the "back" end function of memory with the "front" end function, the "back" end function essentially being performed once (only) at the width of two words to deliver both the present requested and the next sequential, read-ahead or prefetched, data word—thus doing in one "back" end cycle of a memory what the apparatus of Scheuneman does in two such cycles.

Also in the Scheuneman invention, the very next subsequent reference to the asychronous memory unit must be, in order to utilize the pre-fetched data word, a reference to the next sequential address. The present invention accords that data words will be prefetched for only one(s) of a multiplicity of requestors, and that intervening requests of other requestors subsequent to the prefetching will not disturb the prefetched data word. Thus the speed advantage of prefetching is maintained even when the next subsequent reference is not to that next sequential address for which data has been read ahead, or prefetched.

It is also well known in the prior art that the required refreshing of dynamic random access memories (DRAMS) should be performed, insofar as is possible, in parallel with, or in the background of, normal (productive) operations. For example, U.S. Pat. No. 4,357,686 for HIDDEN MEMORY REFRESH to the selfsame inventor Scheuneman, and other U.S. patents cited therein, show various means of performing the refresh of DRAMs during periods of idleness, to only such extent as is required, and in the background of normal memory operations. The present invention, being a prefetching memory, will show that the refresh of DRAMs is advanageously accomplishable in time overlap with the provision of read-ahead, prefetched, data words upon such times as such words are the subjects of read references by requestor users.

SUMMARY OF INVENTION

The present invention is an independently timed asychronous memory unit which internally prefetches one data word from a next consecutive, odd, address in equal time, and without performance impact on, the fetching of a data word from an even address in response to a user request. Furthermore, such no-time-overhead prefetching, or reading ahead, of a data word from an odd address may be conditioned to transpire dependent upon the raising of a unique signal by the requestor user during the reading of the data word from the even address. Normally only one or ones of the totality of requestors with which the memory communicates will raise this unique signal, identifying themselves thereby as a requestor user or users which is (are) likely to make sequential read requests of the memory. Furthermore, when the prefetching of data is conditioned upon the user supplied unique signal then all requestor users which do not raise such unique signal while communicating with the memory for the reading or writing of data at any address will not disturb such data word as may have been previously read-ahead, or prefetched, for a one of those requestors for which such prefetching was enabled. Thus a requestor user which is probably sequential in addressing references to memory, and so indicates by raising the prefetching enablement signal, may make a next subsequent sequential reference to an odd address and expeditiously obtain the data word already read-ahead from such address even should any number of requestor users which are most probably non-sequential in their access to memory, and so indicate their non-sequential nature by not raising the prefetching enablement signal, have made any number of intervening requests of the memory. The read-ahead, or prefetching, method and apparatus of the present invention is adaptive, meaning that the individual user requestors may determine whether prefetching is performed. The read-ahead, or prefetching, method and apparatus of the present invention is selective, meaning that prefetching may be performed (only) for some selected ones, and not performed for the other ones, of a number of requestor users which access the memory of the present invention.

This manner of adaptive prefetching of the present invention satisfies a common characteristic of the common computer environment wherein multiple requestors make access to a single memory. Some one(s) of these requestors are often highly sequential in their references, nominally central processing unit(s) (CPU(s)) which make consecutive references to instructions and (often) data. Other types of requestors commonly but infrequently make consecutive addressing references to a memory. An example of such a requestor is an input/output controller (IOC) which serves, in an intermixed time-sliced manner, a number of I/O channels each of which is communicating (buffering) information, which information is probably both different (i.e., stored in different memory locations) and differentially progressed in the point (the address of the buffer) to which such communication has transpired. Consequent to such activity, an IOC is unlikely to make consecutive references to a memory even though the individual buffered transfers as may be communicated on individual channels are often of sequential memory stores.

The organization and the operation of the memory of the present invention is such that when a requestor indicating itself to be a sequential requestor, via the raising of a unique signal upon a dedicated signal line—nominally the CPU(s) requestor(s) most probable of making successive addressable references to memory-does (do) make a memory address to an even address memory cell, then the memory of the current invention will in even time fetch both such even address and the next sequential odd address. If a subsequent request from any requestor is to this next sequential odd address, then the memory will respond faster (approximately 47% in the preferred embodiment of the invention) because the memory data word from this next sequential odd address has already been retrieved from the randomly addressable memory and is present in a holding register, from which it may be issued with greater speed. If a request of memory from any requestor indicating itself to be a non-sequential requestor via the unique signal line—nominally the IOC(s) requestor(s) making non-sequential requests of memory—then the prefetched data will not be disturbed and the memory of the present invention will still exhibit increased performance in the delivering of words from sequential addresses to the sequential requestor(s).

It is a further aspect of the present invention that when a request occurs for which a word has been prefetched, then the dynamic random address memory of the preferred embodiment of the present invention will force a refresh sequence, thereby hiding the overhead time of such refresh behind the memory reference. That such refresh is taken in the "back" end of memory will have no effect upon the performance increase (nominally 47%) in the delivery of the prefetched word from the holding register.

Correspondingly, it is a first object of the present invention that a memory which performs one word at a time prefetching should do such responsively to designated ones of a plurality of requestors which communicate with such memory, such designation of those requestors for which advance read, or prefetching, should be performed being dynamic and adaptive in accordance with the provision of a single unique signal upon a single unique signal line from each and all requestors to the memory upon each reading of data from such memory.

It is a second object of the present invention that any and all read requests of memory at any time(s) by any requestor(s) identifying, via said unique signal upon said unique signal line, that read-ahead, or prefetching, should not be performed for that (those) requestor(s) will cause that any priorly read-ahead,meaning prefetched, data will not be disturbed and will remain available for satisfaction of the present or of subsequent read requests.

It is a subordinate third object of the present invention that the particular mode and manner by which prefetching is performed is that two words, one at an even address and one at the next sequential odd address, will be obtained upon each request to an even address (only) from a requestor identifying itself via the unique signal as a sequential requestor. The word obtained from the even address is immediately issued to such requestor responsively to the request, whereas the word from the next sequential odd address is placed in a holding register as a read-ahead, or prefetched, data word.

It is a subordinate fourth object of the present invention that when the memory is able to deliver to any requestor a prefetched word, such word as has already been read-ahead from memory and placed in holding register, then during such delivery the memory will force a refresh sequence of the dynamic random access memory stores, thereby hiding the overhead time of this refresh behind the delivery of the prefetched word to the requestor, and thereby showing a performance increase. The performance increase which is obtained by conducting refresh of dynamic random access memory stores in the shadow of the issuance of prefetched words is in addition to, and complementary of, the enhanced performance of the memory which is obtained, to the extent of the existence of sequential requestor(s), solely by the fact that sequential odd addresses may be prefetched.

CONVENTIONS EMPLOYED

Figure 1:
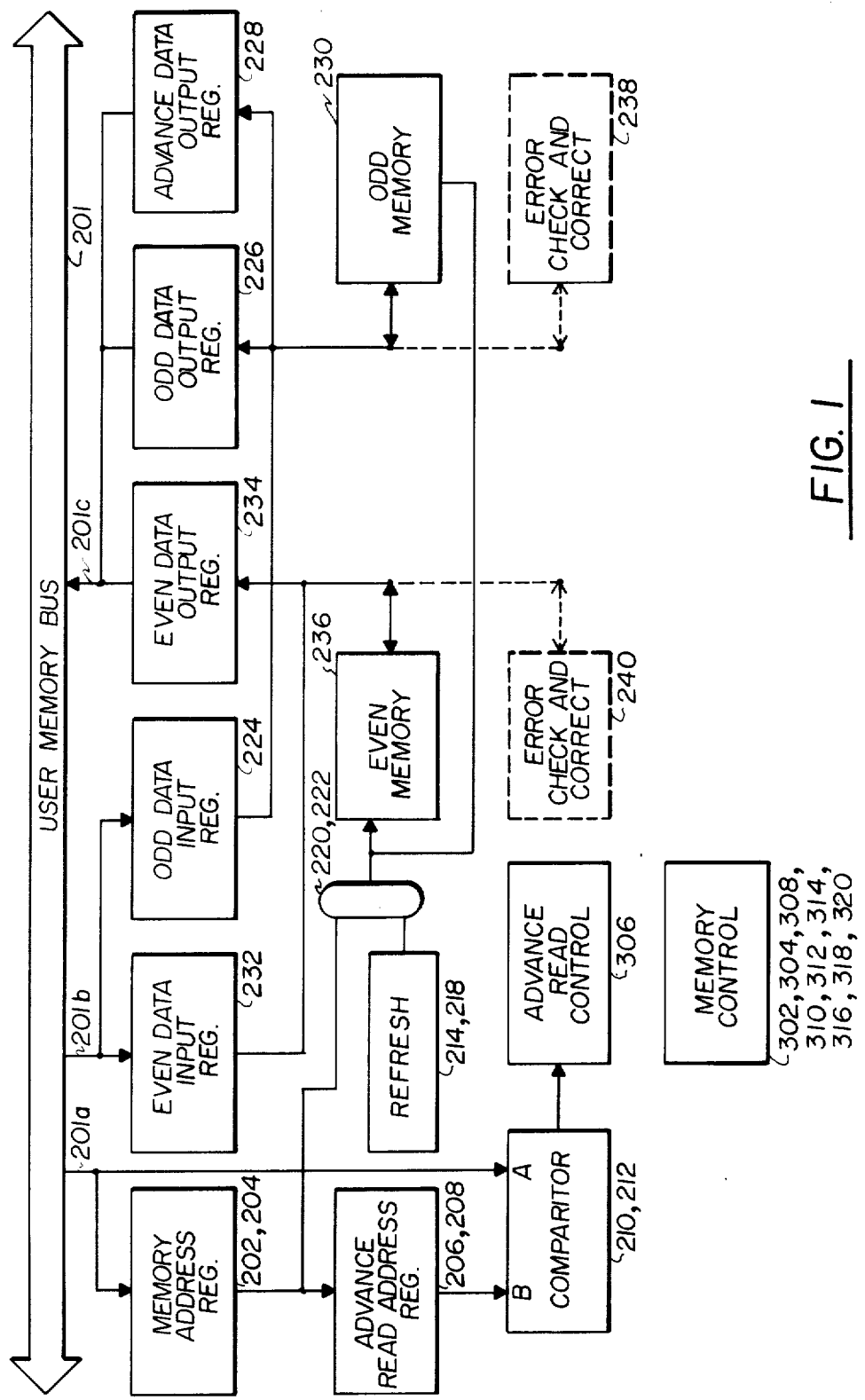
FIG. 1 shows a first level block diagram of the memory apparatus of the present invention such as accords the prefetching of data words to designated (by a unique signal), predominantly sequential, one(s) of all the requestors referencing such memory.

Throughout the following description and in the accompanying drawings there are certain conventions employed which are familiar to certain of those skilled in the art. Additional information concerning those conventions is as follows. Throughout the drawings, the reference designations of all logical elements and miscellaneous parts are assigned even reference numerals. All wire nets, signal lines, cables, pins, buses and like interconnects are assigned odd reference numerals. Such odd reference numerals may be comprised of up to 3 digits which designate that logical subassembly which is the origin of signals carried upon the signal line, and, separated by a dash (—), a unique numerical designation of the signal line amongst all such signal lines originating at the identical logical subassembly.

The logical elements from which the present invention is constructed are available in industry standard transistor transistor logic (TTL) technology, and the specific types of such logical elements are generally determinable from the standard schematic representation used. Wherein the exact nature of any logical element is not readily apparent from the schematic diagram, the preferred industry standard part number for such logical element is referenced within the specification disclosure.

Signal lines and cables are accorded unique descriptive names invariant at all points of usage. In the event of typographical errors in such names, then the assigned reference numerals, also invariant at all points of usage, are the controlling designations for all logical interconnections. The descriptive names are preceded by an (H) if a logic High, nominally plus 3 volts DC, signal level reflects the true state of the named signal condition, and conversely, by an (L) if a Low, nominally 0 volts DC, signal level reflects the same true state. Signal lines generally enter at the top of logic diagram and exit at the bottom.

Memonics are also employed as an aid to teaching functional signal flow between various logical sections. These memonics appear upon brackets subtending a signal or signals either entering or leaving a figure. For example, some of the memonics associated with bracketed signals readily perceivable in FIG. 3 are associated with the interfare to the control logics of the present invention occurring from the USER MEMORY BUS, whereas other such memonics represent communication to and from the control logics of FIG. 3 and the data registers and other controlled structure of the present invention predominantly visible in FIG. 2.

Signals which enter or exit the control logics of the present invention shown in FIG. 3 altogether from outside the memory of the present invention are accorded a further, final symbolism in order that they be most clearly recognized. Signals received from the USER MEMORY BUS itself are tipped by a "Y"—like ingress symbol, while signal lines exiting the control logics to the USER MEMORY BUS are "V"—tipped, like arrows, as an egress symbol. Within the detailed logic diagram of FIG. 3, these signals communicating between logical subassemblies designated even numbers 302 through 320 of such MEMORY CONTROL are accorded a two letter net number designation which appears within circles at the origin or terminus of signal lines within each drawing sheet of FIG. 3. These net number designations, subordinate to both the identification numerals and the signal names, represent but yet another means by which the complete interconnection of the digital logics at the present invention may be rigorously understood.

DESCRIPTION OF THE PREFERRED EMBODIMENT

The present invention is a multi-ported asynchronous memory unit servicing a multiplicity of requestors wherein for designated one(s) only of such requestors, which requestor(s) identifies itself (themselves) to be designated one(s) by the raising of a unique signal, the memory will simultaneously fetch both the data words at the even address and at the next sequential odd address upon each reference read to an even address by such designated one(s) requestor(s). The memory will issue to each such designated requestor the data word directed to be read from the even address, while simultaneously storing the next sequential data word obtained at the odd address in an internal memory register. The storage is tantamount to having read-ahead, or prefetched, such memory word at the next sequential odd address should a subsequent reference read be made thereto. This prefetched data word will not be disturbed should the memory service subsequent requests from certain designated other requestors, which other requestors do identify via the selfsame unique signal that a memory prefetch is not to be performed, priorly to receiving a subsequent request from any requestor designating that a prefetch should be performed. If a subsequent request from any requestor is not to that odd address for which the data word has been prefetched, then the servicing of such request will transpire normally (including the prefetching of yet another data word from an odd address if such subsequent reference is both by a requestor designating prefetching and to yet another even address). However, if any subsequent request from any requestor is to that odd address for which the data word has already been prefetched, then such prefetched data word will be issued to such requestor with enhanced speed while, additionally, the random address memory stores, which are of the dynamically refreshed random address memory type, will be refreshed in the same time during which the response to the requestor is being made through the issuance of the prefetched data word. By so "hiding" the overhead time normally accorded to memory refresh sequences, and additional, minor, performance increase may be registered in the memory of the present invention in addition to that performance increase which is obtainable from having issued the prefetched data word in an accelerated manner to a requestor. An issuance of a prefetched data word does not effect its subsequent availability. Only a request to an even address by a requestor designating itself (via the signal) as sequential, meaning enabling of the prefetching of the memory, does cause the rewriting of a new prefetched data word into the storage register therefor.

A first, top, level block diagram of the memory apparatus of the present invention is shown in FIG. 1. A multiplicity of requestor users connected through USER MEMORY BUS 201 communicate with the asychronously timed memory unit for the reading and writing of data stored therein. Communication with the memory unit is through 11 control lines (shown in FIG. 3 and explained in conjunction therewith), through ADDRESS IN lines 201a (nominally 16 lines are used), through DATA IN lines 201b (nominally 18 lines are used), and through DATA OUT lines 201c (nominally 18 lines are used)—all of which lines 201a, 201b, and 201c are really the same physical lines (nominally 18 in number) which are separately identified in FIG. 1 only to more clearly show functional usage. Control of the memory for a read or write communication therewith will be obtained by one requestor in accordance with the manner to be explained in conjunction with FIG. 3, and such requestor will indicate whether it is a sequential requestor, of which in many systems there is normally only one within the multiplicity of requestors with which a memory may, at successive times, communicate. The requestor so indicates that it is a sequential requestor by a unique control line called SEQUENTIAL USER (to also be discussed in conjunction with FIG. 3.).

Continuing in the top level block diagram of FIG. 1, when any user makes a request of the asynchronous memory unit represented therein such FIG. 1, the address is received via lines 201a into MEMORY ADDRESS REG. 202, 204. If this address is an even address from a requestor identifying itself as a sequential requestor (by raising the signal SEQUENTIAL USER to be explained in conjunction with the control logics in FIG. 3), then such address as becomes held in MEMORY ADDRESS REG. 202, 204, will be incremented by one (through setting the lease significant binary bit) and stored in the ADVANCE READ ADDRESS REG. 206, 208. Upon any receipt of an odd address from any requestor, such odd address on lines 201a will be compared with the advanced read address held in ADVANCE READ ADDRESS REG. 206, 208 within COMPARATOR 210, 212. A match within COMPARATOR 210, 212, which match indicates that the data word at such odd address has been prefetched, enables certain operations to transpire under control of ADVANCE READ CONTROL 306.

Continuing in FIG. 1 in explanation of the top level block memory apparatus of the present invention, the memory address as held in MEMORY ADDRESS REG. 202, 204 is normally (meaning that a match to a prefetched address has not been obtained) gated through multiplexer 220, 222 to EVEN MEMORY 236 and ODD MEMORY 230. The EVEN MEMORY 236 contains the full width data words for all even addresses within the entire memory apparatus, and the ODD MEMORY 230 contains the full width data words for all odd addresses within the entire memory apparatus. The data word from the addressed location is, respectively as to whether such addressed location is even or odd, caused to be EVEN DATA OUTPUT REG. 234 or ODD DATA OUTPUT REG. 226. In a similar manner to the addressing of EVEN MEMORY 236 and ODD MEMORY 230 for the reading, or outputting, of data, a full word of input data to be stored within EVEN MEMORY 236 is recovered via lines 201b to EVEN DATA INPUT REG. 232 whereas a full word of data to be stored within ODD MEMORY 230 is obtained on lines 201b or USER MEMORY BUS 201 into ODD DATA INPUT REG. 224. During a write operation such data in EVEN DATA INPUT REG. 232 and ODD DATA INPUT REG. 224 is respectively stored in EVEN MEMORY 236 or ODD MEMORY 230. Each of the EVEN MEMORY 236 and ODD MEMORY 230 may optionally be provided with error detection and correction circuitry, such as is routine in the art and such as is indicated by the dashed line enclosed (indicating optional) respective logic circuitry ERROR CHECK AND CORRECT 240 and 238 in FIG. 1.

Continuing in FIG. 1, only when an even address is being read to a designated sequential requestor will the word at the next sequential odd address as contained in ODD MEMORY 230 be additionally read and stored in ADVANCE DATA OUTPUT REG. 228. Normally the full-width data words from even locations as are obtained from EVEN MEMORY 236 and held in EVEN DATA OUTPUT REG. 234, or the full-width data words from odd memory locations as are obtained from ODD MEMORY 230 and held in ODD DATA OUTPUT REG. 226, are issued onto the USER MEMORY BUS 201 via lines 201c. When, however, a match to that odd address stored in ADVANCE READ ADDRESS REG. 206, 208 is obtained in COMPARATOR 210, 212, then ADVANCE READ CONTROL 306 will alternatively cause the prefetched data word stored within ADVANCE DATA OUTPUT REG 228 to alternatively be emplaced upon lines 201c of USER MEMORY BUS 201.

Continuing in FIG. 1, the refresh of the dynamically refreshable random access memory stores of both EVEN MEMORY 236 and ODD MEMORY 230 is obtained under the control of REFRESH 214, 218. When, under the control of ADVANCE READ CONTROL 306, the prefetched data word loged within ADVANCE DATA OUTPUT REG. 228 is being issued (necessarily in response to a request to read an odd address) upon USER MEMORY BUS 201, then said REFRESH circuitry 214, 218 will be enabled to conduct a refresh sequence of EVEN MEMORY 236 and ODD MEMORY 230 in time overlap with such transfer of data upon USER MEMORY BUS 201. By this operation, also under the control of ADVANCE READ CONTROL 306, the time overhead of the refresh operation is hidden behind such reading(s) of prefetched data words as occurs, and a performance increase in the time during which the asynchronous memory module is available to service requests, and is not conducting refresh operations, is obtained. The general control of all data flow and operations represented in the top level block diagram of FIG. 1 is obtained from MEMORY CONTROL 302, 304, 308, 310, 312, 314, 316, 318, 320. Also part of the control of the memory is ADVANCE READ CONTROL 306. The detail logic circuits of all such control are fully shown in FIG. 3, and will be explained in conjunction therewith.

Figure 2D:
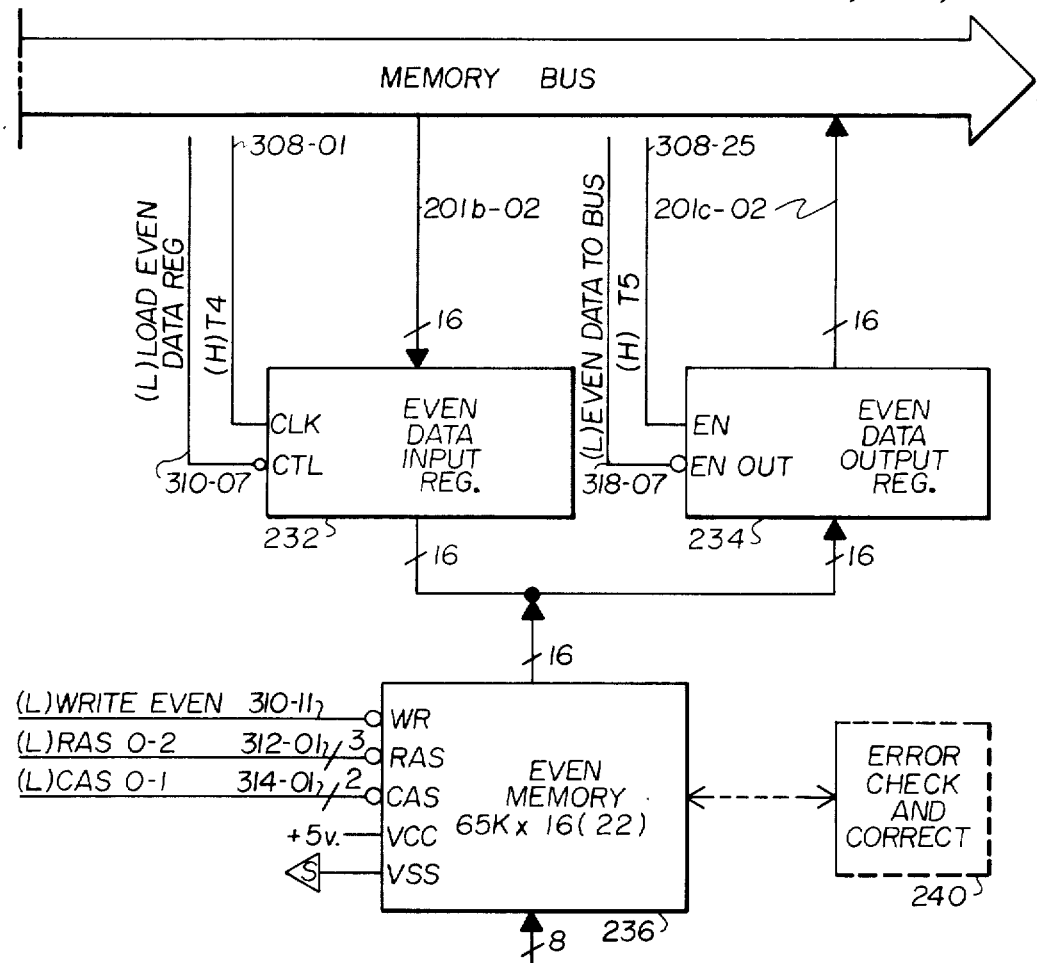
FIG. 2, consisting of FIG. 2a through FIG. 2d shows a second level block diagram of the data flow occurring within the memory apparatus of the present invention.
Figure 2:
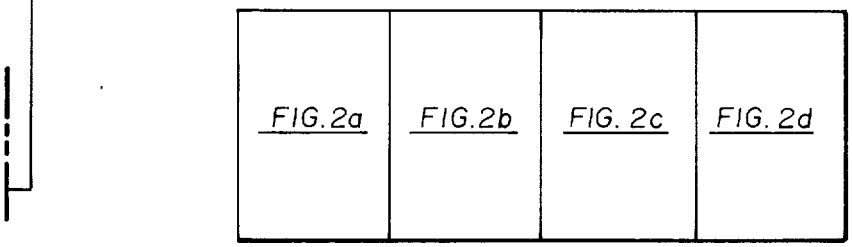

The second level, data flow, block diagram of the present invention of a multi-user read ahead memory is shown in FIG. 2, consisting of FIG. 2a through FIG. 2d. The MEMORY BUS 201, previously seen in FIG. 1, is the means by which a plurality of asynchronous requestors do, via data and control lines, communicate with the instant memory for the writing of data thereto and the reading of data therefrom. The preferred embodiment construction of the memory is with transistor-transistor logic (TTL), and the interface circuits thereto are TTL compatible. The loading of each input signal to the present memory will be less than or equal to that exhibited by a single 54S00 industry standard circuit. The drive capability of all output circuits of the present memory is equal to or greater than the output drive of one 54LS367 industry standard circuit. The DATA OUTPUT lines 201c, the signal (L)MEM BUSY on line 316-03, and the signal (L) DATA READY on line 320-01 (shown in FIG. 3) are tri-state such that these memory outputs will be an open circuit (with sink or drive currents less than 40 microamperes) when the present memory is not enabled, or not powered on. Within the present logics a logical one is represented by a High signal level of 2.2 volts minimum to 5.25 volts maximum, and is nominally +3 v.d.c. A logical zero is represented by a Low signal level of 0 volts minimum to 0.60 volts maximum, and is nominally 0 v.d.c.

Figure 2A:
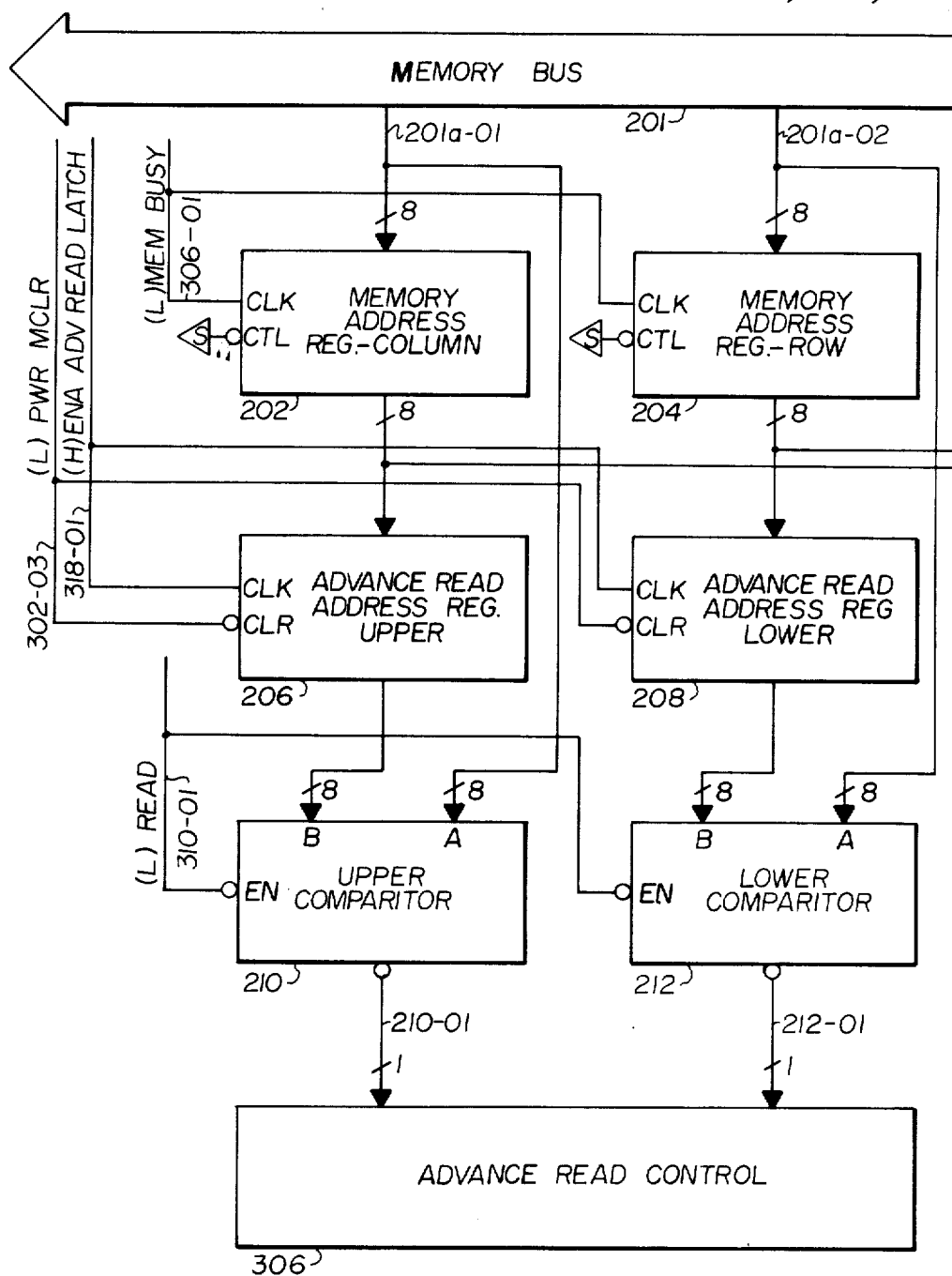

Continuing with the discussion of the second level, data flow, block diagram of the present memory as shown in FIG. 2, the addressing signals on lines 201a, previously seen in FIG. 1, are shown in 8-bit parts upon lines 201a-01 and 201a-02 in FIG. 2a. The signals upon the 16 address lines, address bits $2^0$ through $2^{15}$, specify the storage location within the ODD MEMORY 65K $\times$ 16 230, or within the EVEN MEMORY 65K $\times$ 16 236, which is to be accessed during a memory cycle. The 16 bit memory address is clocked, by 8-bit halves, into the MEMORY ADDRESS REG.-COLUMN 202 and MEMORY ADDRESS REG.-ROW 204 registers under the High condition of signal (L) MEM BUSY on line 306-01, such High signal condition as represents that the memory is not busy. The 16-bit memory address is also gated, by halves, into UPPER COMPARATOR 210 and LOWER COMPARATOR 212 under the Low condition of signal (L) READ on line 310-01. The detailed manner of the generation of all control and clocking signals such as have series 3XX-XX identification numerals will be shown in detail in FIG. 3. For example, and as may be verified by momentary reference to FIG. 3d, the signal (L) READ on line 310-01 is generated within the WRITE CONTROL functional logical subsection 310 as the inversion of signal (L) WRITE on line 310-19 received from the user on MEMORY BUS 201. Therefore, it may be understood that the second level data flow block diagram of FIG. 2 neither shows the control signals such as occur upon MEMORY BUS 201 nor the generation in digital logics of those gating and enablement signals which, when applied to the logical structures of the data flow block diagram, enable the operation of the current memory. As before said, the generation of all the timing and control signals, indicated as 3XX-XX series signals in FIG. 2, utilized in the control of data flow within the memory of the present invention will be shown within the detail logic diagram of FIG. 3.

Continuing in FIG. 2, the ADVANCE READ ADDRESS REG. UPPER 206 and the ADVANCE READ ADDRESS REG. LOWER 208 are initially cleared upon power off by Low condition of signal (L) PWR MCLR on line 302-03. Thereafter, such ADVANCE READ ADDRESS REG. 206, 208, (previously seen in FIG. 1) are loaded upon the High occurrence of signal (H) ENA ADV READ LATCH on line 318-01. Such signal (H) ENA ADV READ LATCH on line 318-01 will be High, enabling the loading of an advance read address, only upon a request from a sequential user. Such is one of the primary characteristics of the present invention, meaning that that address, necessarily obtained of the sequential requestor, which is lodged within the ADVANCE READ ADDRESS REG. UPPER 206 and ADVANCE READ ADDRESS REG. LOWER 208 will not be disturbed, or reloaded, save upon a subsequent request from a sequential requestor. Intervening requests by memory users not identifying themselves to be of the sequential type will, by the action of such control logics will be explained in conjunction with the ADVANCE READ/BUS ENABLE functional logical subsection 318 shown in FIG. 3, not cause signal (H) ENA ADV READ LATCH on lines 318-01 to become High, and no updated memory address will be lodged within the ADVANCE READ ADDRESS REG. UPPER 206 or ADVANCE READ ADDRESS REG. LOWER 208.

The 16-bit address received upon MEMORY BUS 201 on lines 201 is also distributed in the 8-bit upper half on lines 201-01 to UPPER COMPARATOR 210, and in lower 8-bit half on lines 201-02 to LOWER COMPARATOR 212. Therein such comparators it is respectively compared with the 8-bit contents of ADVANCE READ ADDRESS REG. UPPER 206 and ADVANCE READ ADDRESS REG. LOWER 208 to respectively develop, on lines 210-01 and lines 212-01, Low signals in the event of an equal comparison. Such signals are received at ADVANCE READ CONTROL 306, which will be seen in FIG. 3c and explained in conjunction therewith, wherein said Low signals representing equal comparisons will be seen to initiate a number of control sequences associated with the issuance of the read-ahead data word from the ADVANCE DATA OUTPUT REG. 228 shown in FIG. 2c.

Figure 2B:
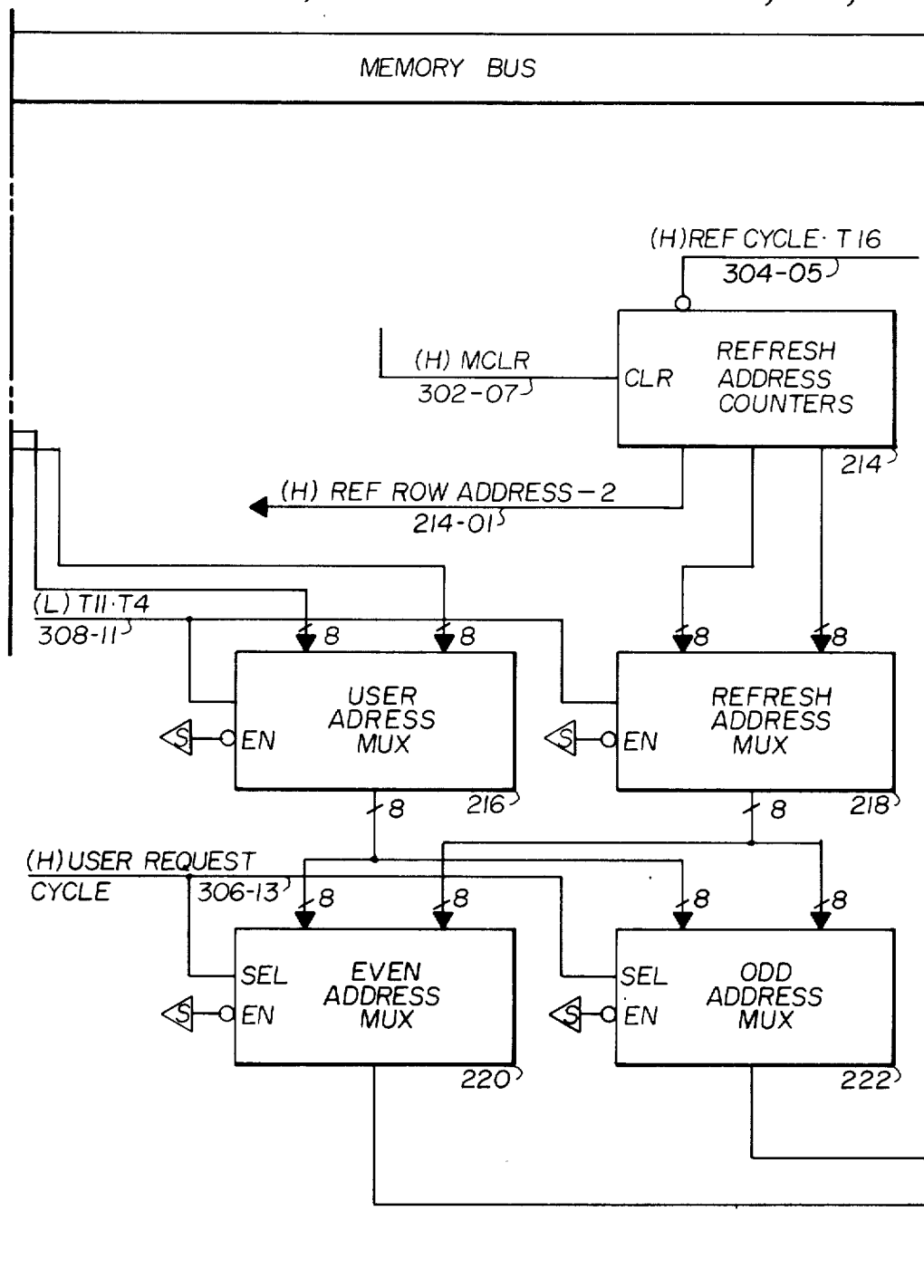

Continuing to FIG. 2b, it may be noticed bit memory address as lodged by upper and lower halves in MEMORY ADDRESS REG.-COLUMN 202 and MEMORY ADDRESS REG.-ROW 204 are respectively gated through the USER ADDRESS MUX 216 upon the respective Low and High conditions of signal (L) T11.T4 on line 308-11. Such signal (L)T11.T4 on line 308-11, which is a timed signal, is developed within the TIMING CHAIN functional logical subsection 308 shown in FIG. 3. Such signal is also supplied to gate, in its respective Low and High condition, the respective upper 8-bits and lower 8-bits of the 16-bit REFRESH ADDRESS COUNTERS 214. The REFRESH ADDRESS COUNTERS 214 are cleared upon the High occurence of signal (H)MCLR on lines 302-07, and are thereafter incremented by the Low occurence of signal (H)REF CYCLE.T16 on line 304-05, which signal is developed in the REFRESH TIMING functional logical subsection 304 shown in FIG. 3. The 8-bit column address comprises the least significant 8-bits of the REFRESH ADDRESS COUNTERS 214, and the 8-bit row addresses comprises the most significant 8-bits of REFRESH ADDRESS COUNTERS 214. Of such 8-bit row address, the third least significant row address bit, or row address bit 3, is supplied as signal (H)REF ROW ADDRESS-2 on line 214-01, which signal line returns to the REFRESH TIMING functional logical subsection 304 shown FIG. 3. The object of the REFRESH TIMING, such as involves REFRESH ADDRESS COUNTERS 214, REFRESH ADDRESS MUX 218, and the REFRESH TIMING functional logical subsection 304, is to accomplish the refresh of the ODD MEMORY 65×16 230 and EVEN MEMORY 65K×15 236, each which memory has a 600 millisecond cycle time, every 16 microseconds. The address for such refresh is contained within the REFRESH ADDRESS COUNTERS 214. The timing of such refreshing of the dynamic random access memories, and the refreshing of such dynamic random access memories in the shadow of, or behind, the supply of an advance read word (which can be as often as every second request), will be shown in the REFRESH TIMING functional logical subsection 302 shown in FIG. 3.

Continuing in FIG. 2b, the High condition of signal (H) USER REQUEST CYCLE on line 306-13 serves to gate the user supplied address, or the refresh address, each by successive 8-bit row and column address parts, to the EVEN ADDRESS MUX 220 and ODD ADDRESS MUX 222 and thence to the respective ODD MEMORY 65K×16 230 and EVEN MEMORY 65K×16 236. The signal (H) USER REQUEST CYCLE on line 306-13 will later be seen to be developed in ADVANCE READ functional logical subsection 306, shown in FIG. 3, in consideration of the memory address bus bit 0: signal (H)MEM ADDRESS - 0 on line 306-13 (shown in FIG. 3c). The signal (H) USER REQUEST CYCLE on line 306-13 will be High, enabling a user address reference of memory, when either such memory address bus bit 0 is logical "0", indicating an even user address, or, when (1) such bit is logical "1", indicating an odd address, and (2) such odd reference address has not resulted in an advance read cycle as determined by UPPER COMPARATOR 210 and LOWER COMPARATOR 212 communicating to ADVANCE READ CONTROL 306 (shown in FIG. 2a). The present memory will function to read two complete words at a time, the even address word and the next successive odd address word, for each even address reference thereto the memory by a user device. If any user device, whether a sequential or non-sequential user device, does reference an odd memory address then the data contents of such address will be supplied from the read-ahead memory word stored in the ADVANCE DATA OUTPUT REG. 228 (shown in FIG. 2c) if such is available. If the desired word at an odd memory address has not been read-ahead, then signal (H)USER REQUEST CYCLE on line 306-13 will also be High, enabling the reading of the desired data word from the odd address within ODD MEMORY 65K×16 230 as well as enabling the superfluous reading of the memory word at the immediately preceding even address from EVEN MEMORY 65K×16 236.

Continuing in FIG. 2 with the address flow for the accomplishment of a user address reference to memory, the 16-bit memory address obtained on lines 201A and stored in 8-bit row and column parts within MEMORY ADDRESS REG.-ROW 204 and MEMORY ADDRESS REG.-COLUMN 202 is successively gated, first by row and then by column part, to USER AD- DRESS MUX 216. If a user request cycle is enabled, such as always results for reference to an even address and may result for reference to an odd address for which the desired data word has not been read-ahead, then the High signal (H)USER REQUEST CYCLE on line 306-13 will gate such 8-bit row address, followed by such 8-bit column address, through both EVEN ADDRESS MUX 220 and ODD ADDRESS MUX 333 to respectively reference EVEN MEMORY 65K × 16 236 and ODD MEMORY 65K × 16 230. If a user reference to memory is not transpiring, and the memory is idle, then the dynamic random access memories will be refreshed responsively to the addresses within the REFRESH ADDRESS COUNTERS 214. In a like manner to a user memory reference, the 8-bit refresh address is gated, by row and then by column parts, from the REFRESH ADDRESS COUNTERS 214 through the REFRESH ADDRESS MUX 218 to both the EVEN ADDRESS MUX 220 and ODD ADDRESS MUX 222 and then respectively to EVEN MEMORY 65K × 16 236 and ODD MEMORY 65K × 16 230. The performance of a refresh sequence requires that signal (H) USER REQUEST CYCLE on line 306-13 be Low, indicating that a user memory reference is not in progress.

Figure 2C:
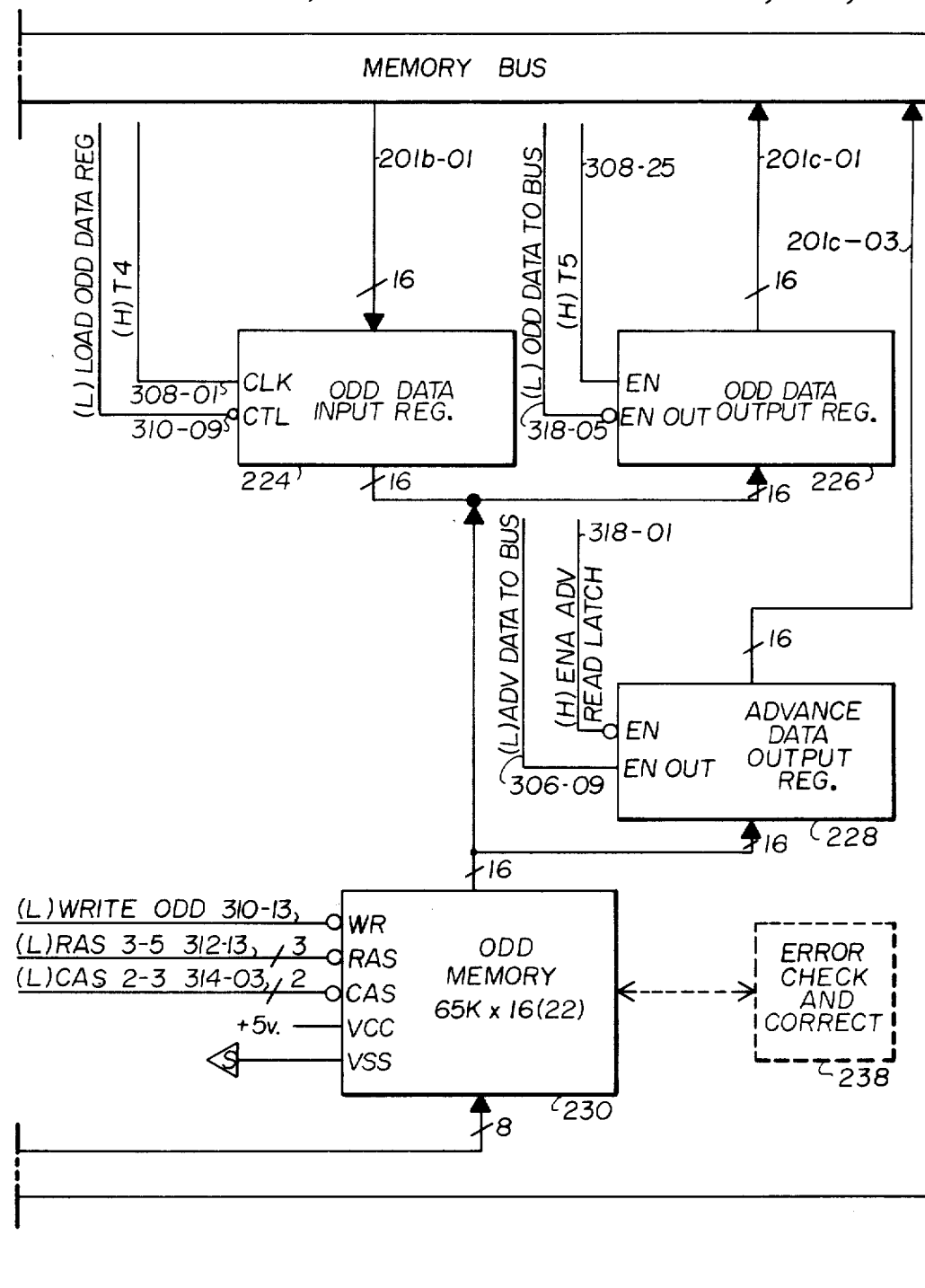

Continuing in the second-level, data-flow, block diagram of FIG. 2, FIG. 2c and FIG. 2d show the communication of data to and from the memory. Momentarily referring to FIG. 1, the input data bus lines 201b and the output data bus lines 201c shown therein are actually the identical self-same 16 data lines of USER MEMORY BUS 201. In a like manner, the input data bus lines 201b-01 and 201b-02, and the output data bus line 201c-01, 201c-02 and 201c-03 are all the self-same identical 16 data lines of memory bus 201. These 16 lines are separated in the representation of FIG. 1, and again separated within the representation of FIG. 2c and FIG. 2d, only for purposes of illustrating the data flow.

Continuing in FIG. 2c and FIG. 2d, responsively to whether the least significant address bit 20 on MEMORY BUS 201 is a logical "1", indicating odd, or logical "0", indicating even, the signal (L) LOAD ODD DATA REG. on line 310-09 or the signal (L) LOAD EVEN DATA REG. on line 310-07 will alternatively be Low, respectively causing the 16-bit input data word to become lodged in ODD DATA INPUT REG. 224 or EVEN DATA INPUT REG. 232. Such input data is clocked into the ODD DATA INPUT REG. 224 or the EVEN DATA INPUT REG. 232 under the High condition of signal (H)T4 on line 308-01, such signal as is derived from the WRITE CONTROL functional logical subsection 308 shown in FIG. 3. Meanwhile, the successive application of the row and column addressing singals to the memories occurs as the Low condition of signals (L)RAS 3-5 on the 3 lines (provided for signal fan-out capability) 312-3, and signal (L)CAS 2-3 on the two lines 314-03 to address ODD MEMORY 65K × 16 230. Likewise, the Low signal (L)RAS 0-2 on the 3 line 313-01 followed by the Low signal (L)CAS 0-1 on the two signal lines 314-01 do enable, by successive row and column address parts, the addressing of EVEN MEMORY 65K × 16 236. The Low condition of signal (L)WRITE ODD on line 310-13 will cause the contents of the ODD DATA INPUT REG. 224 to be entered into the addressed location of ODD MEMORY 65K × 16 230. Likewise, the Low occurence of signal (L) WRITF EVE on line 310-11 will cause the 16-bit contents of the EVEN DATA INPUT REG. 232 to be entered into the address location of EVEN MEMORY 65K × 16 236.

Continuing in FIG. 2c and FIG. 2d, the manner by which the present memory does perform to read ahead the contents of such odd memory addresses, and to subsequently, should such address contents be requested, expeditiously issue such read-ahead contents to the user requestor will next be discussed. During a read operation, such as involves the application of a row address to the memory in conjunction with the row address select signals, and the application of the column address to the memory in conjunction with the column address select signals, the ODD MEMORY 65K × 16 230 and the EVEN MEMORY 65K × 16 236 will simultaneously present a respective odd and even addressed 16-bit data word to the respective ODD DATA OUTPUT REG. 226 and the EVEN DATA OUTPUT REG. 234. The addressed data word of the ODD MEMORY 65K × 16 230 is additionally stored in the ADVANCE DATA OUTPUT REG. 228 under the control of enablement (H)ENA ADV READ LATCH on line 318-01. The High, or enabling, condition of such signal (H)ENA ADV READ causing the loading of the read- ahead data quantity into the ADVANCE DATA OUTPUT REG. 228 will be later seen, in the ADVANCE READ/BUS ENABLE functional logical subsection 318 shown in FIG. 3, to be developed only when the present read is responsive to a read request from a sequential requestor. Thus, the read data word is not lodged within the ADVANCE DATA OUTPUT REG. 228 upon each reading of ODD MEMORY 65K × 16 230, but only when such memory is being read at an even address by a sequential requestor.

Continuing in FIG. 2c and FIG. 2d, the data word read from the ODD MEMORY 65K × 16 230 and the data word read from the EVEN MEMORY 65K × 16 236 are always respectively lodged in the ODD DATA OUTPUT REG. 226 and EVEN DATA OUTPUT REG. 234 under the High condition of enablement signal (H)T5 on line 308-25. Responsively to whether the read has been of an odd, or an even, address, the contents of the ODD DATA OUTPUT REG. 226 or the contents of EVEN DATA OUTPUT REG. 234 will be gated to the MEMORY BUS 201 by the respective Low condition of signal (L)ODD DATA TO BUS on line 318-05 or signal (L)EVEN DATA TO BUS on line 318-07. Alternatively, if the advance read address comparison circuitry shown in FIG. 2a and further shown in FIG. 3 detects that the addressing reference is to that odd data word previously read-ahead and stored within the ADVANCE DATA OUTPUT REG. 228, then such word will be expeditiously gated to the bus under the Low condition of signal (L) ADV DATA TO BUS on line 306-09, and neither the data within ODD OUTPUT REG. 226 nor the EVEN DATA OUTPUT REG. 234 will be gated to the MEMORY BUS 201.

Therefore, and as was initially revealed in FIG. 1, the basic operation of the present memory to read-ahead data words is enabled by the fact that two memories, an even memory and an odd memory, are read in parallel upon each requested read to an even address. The data word read from the even address is issued to the requestor, but the data word from the odd address will be stored in an ADVANCE READ data register conditionally dependent upon whether the request has arisen from a requestor user identified as sequential, i.e., probable of next sequentially referencing this odd address for which the data word is stored. If other, intervening, users of the non-sequential type, ones of multiple such users as may communicate with the present memory, do make intervening read requests for even or for odd addresses to the present memory, the read-ahead data word will not be disturbed. Alternatively, a subsequent user also identifying itself as sequential which is a different user from the first sequential user may access the memory for reading, thereby cuasing a new read-ahead memory word to be stored. The writing of memory by either sequential or non-sequential users does not interfere with the stored read-ahead memory word which was retrieved from an odd address. If any user, sequential or non-sequential (but most probably that sequential user which did initially reference the even address) does register a request to read the memory at that odd address which has been read-ahead, and which is held in register storage, then such read-ahead data word will be more quickly issued to such requestor then would be the case should the random access memory have to be accessed. The ability of the present memory, due to a parallel partitionment into odd memory and even memory parts, to read data from an even and a next successive odd address simultaneously, the data of which odd address becomes read-ahead data, without impact on the time performance of the memory or the delivery of the requested data, is one aspect of the present invention. The ability of the present memory, based in the conditional and selective storage of a data word read-ahead from odd memory addresses, to service multiple users of the sequential (meaning probablistic of sequential accesses) and nonsequential (meaning lessly, or non, probablistic of sequential access) in a manner whereby the read-ahead data word to the sequential user (or users) is preserved during intervening read requests by non-sequential users is another aspect of the present invention. Such aspects, as well as all the control signals applied to accomplish the gating of data in the function of the present memory, will be next explained in conjunction with FIG. 3.

The detail logic diagram of the MEMORY CONTROL 302, 304, 308, 310, 312, 314, 316, 318, 320 (shown in FIG. 1) and the ADVANCE READ CONTROL 306 (shown in FIG. 1 and FIG. 2) is shown in FIG. 3, consisting of FIG. 3a through FIG. 3i. The control signals generated in the logics of FIG. 3 control the data flow within the present multi-user read-ahead memory, such data flow as was shown to transpire between the logic structures shown in FIG. 2. Commencing with the ARRAY SELECT functional logical subsection 302 shown in FIG. 3a, the present memory is selected by satisfaction of the 8-BIT COMPTR 302-02, which 8-bit comparator is part no. AM25LS2521. Signals (H)ADDRESS-17. - to (H)ADDRESS-19 on cable 302-21 are received upon the USER MEMORY BUS 201 from any requestor capable of such an addressing range. When it is so desired to use these addressing lines, thereby selecting the present asynchronously timed memory from amongst a plurality of up to eight (8) such memories, then the enable decode signal (L)MEN ENA on line 302-17 will be a logic "0", or Low. Signals (H)ARRAY SEL 1 through (H)ARRAY SEL 3 on lines 302-19 are derived from the back panel, or system, into which the present memory is plugged and serve as a unique means of identification to such memory. For a memory containing 131 K memory addresses, such as is the preferred embodiment of the present invention, input address bit 18, signal (H)ADDRESS-18 is compared to location code bit 1, signal (H)ARRAY SEL 2; and address bit 17, signal (H)ADDRESS-17, is compared to location code bit 0, signal (H)ARRAY SEL 1. The signal (H)ARRAY SEL 1 is inverted in an INVERTOR, industry standard part no. 54LS04. Upon the selection of the present memory, the Low signal output from the 8 BIT CMPTR 302-02 will be clocked to set the D-TYPE FF 302-04.

Continuing in FIG. 3a, three control signals from the user received on USER MEMORY BUS 201 are shown to be enabled to be received in QUAD BUFFER DRVR RCVR 302-6 under the High enable signal condition arising from a resistive pullup, tied to +5 volts, as signal PULLUP on line 302-09. The logic "1", or High, occurrence of signal (H)CYCLE INITIATE on line 302-23 in conjunction with the logical "0", or Low, occurrence of signal (L)MEM ENA on line 302-17 shall initiate a memory cycle. Signal (L)PWR MCLR on line 302-25 will accomplish an initialization reset of the present memory upon a power up master clear. Similarly, the Low condition of signal (L)I/0 BUS MCLR on line 302-27 will cause a master clearing of the present memory. Such three signals as received in QUAD BUFFER DRVR RCVR 302-06 are distributed as signal (H) CYCLE INITIATE on line 302-01, signal (L)PWR MCLR on line 302-03, and signal (L)MCLR on line 302-05. The Low condition of signal (L)PWR MCLR on line 302-03, representing the occurrence of a master clear, is utilized to clear the ADVANCE READ ADDRESS REG. UPPER 206 and the ADVANCE READ ADDRESS REG. LOWER 208 (shown in FIG. 2a) as well as to reset the user request D-TYPE FF 302-04, such reset condition represents no user request pending. The Low, or master clear, condition of signal (L)PWR MCLR on line 302-03 is also inverted in INVERTOR 302-08, industry standard part no. 54LS04, and distributed as signal (H)MCLR on line 302-07 to the REFRESH ADDRESS COUNTERS 214 (shown in FIG. 2b.). Upon the occurrence of an enabled memory request, the High condition of signal (H)CYCLE INITIATE on line 302-01 satisfies AND gate 302-10 during the High presence of signal (L)REFRESH REQUEST on line 304-07 (which High condition indicates no refresh request pending) and of signal (L) MEMORY BUSY on line 316-01 (which High condition indicates memory not busy). The High signal output of such satisfied AND gate 302-10 clocks the D-TYPE FF 302-04 to clear upon the Low signal input arising from the 8 BIT COMPTR 302-02, producing therefrom such D-type flip-flop in the cleared condition Low signals (L) USER REQUEST on line 302-15 and High signal (H) USER REQUEST on line 302-13. Miscellaneous logic shown in the ARRAY SELECT functional logical subsection 302 is the ANDing of signal (H) EVEN ADDRESS on line 306-03 and (L) READ on line 310-17 in AND gate 302-12 to produce composite control signal (H) EVEN ADD-READ on line 302-11.

Figure 3B:
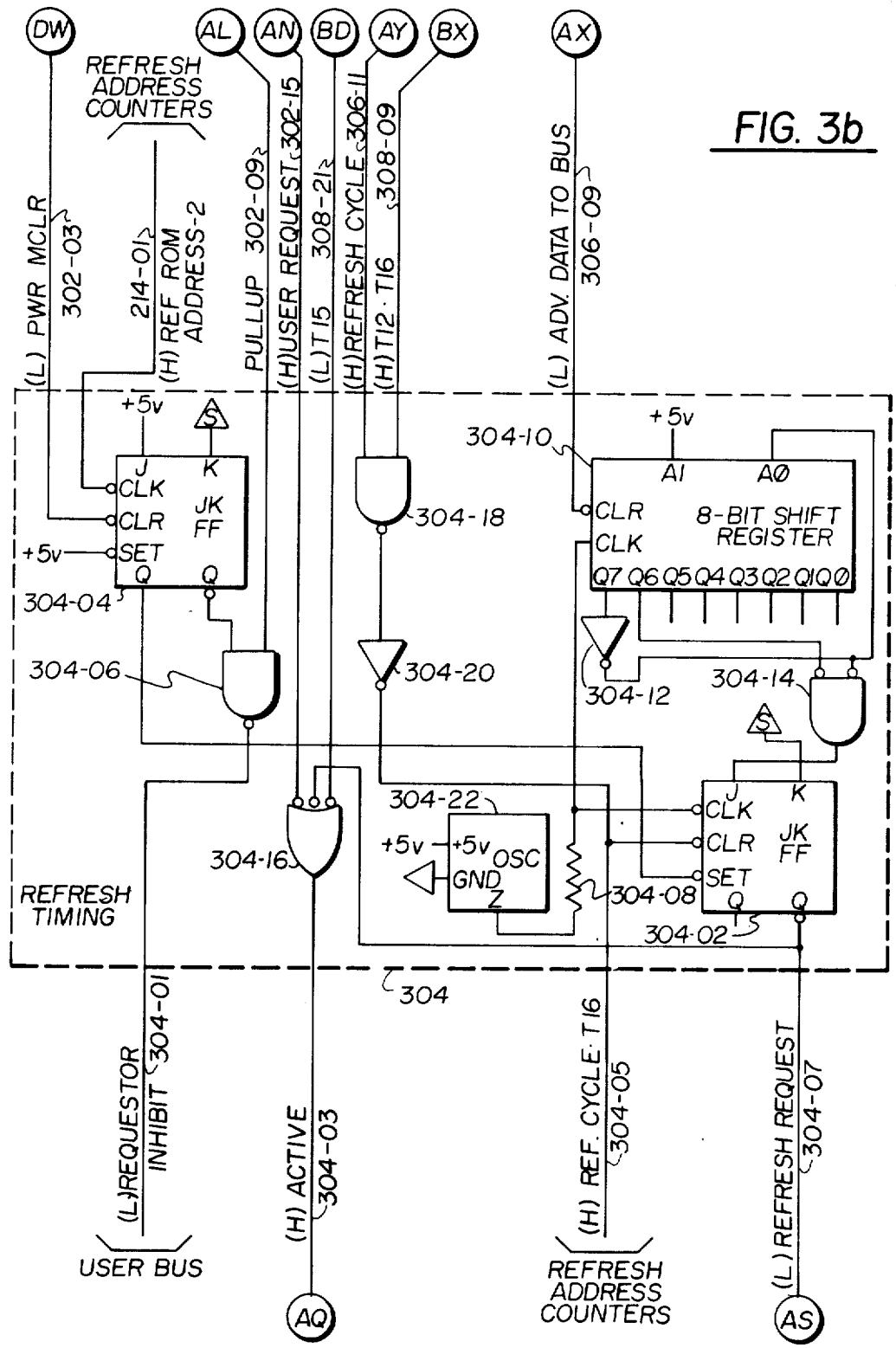
FIG. 3 comprised of FIGS. 3a, 3a-3a, 3a-b, 3b, 3c, 3c-a, 3c-b, 3d, 3d-a, 3d-b, 3d-c, 3e through FIG. 3i, show the detail logic of the MEMORY CONTROL of the apparatus of the present invention.

Continuing with the explanation of the detail control logic shown in FIG. 3, the REFRESH TIMING functional logical subsection 304 is shown in FIG. 3b. The function of the REFRESH TIMING functional logical subsection, such function as is one of the subsidiary objects of the present invention, is to hide the refresh cycle of a dynamic random access memory (DRAM) behind the advance read-ahead function of the present memory. Such refresh must occur every 16 microseconds for a DRAM of access time 600 nanoseconds.

Therefore, if one (only) or more advance read occurs within each 16 microsecond period, there is no time period of unavailability ("time lost") of the present memory to user requestors. Considering the manner of the setting of the refresh request flip-flop, JK FF 304-02, the set signal input to such flip-flop is derived from the set side output signal of the JK FF 304-04. Such set side output signal of the JK FF 304-04 is Low upon the Low occurrence of signal (L)PWR MCLR on line 302-03 representing a power-up master clear. This flip-flop provides a wakeup period for the DRAM's of eight (8) refresh cycles. After eight (8) refresh cycles are completed the signal (H)REF ROW ADDRESSES 214-01 switches from a logic High to a logic Low level clearing JK F/F 304-04. The clear side signal output of JK FF 304-04, High when a wakeup period is attempting to be initiated, is supplied to AND gate 304-06 and gated therethrough by High signal PULLUP on line 302-09 to be supplied as signal (L) REQUESTER INHIBIT on line 304-01, such signal as is transmitted across USER MEMORY BUS 201. Signal (L) REQUESTOR INHIBIT on line 304-01, and signal (L) MEM BUSY on line 316-03 as will later be seen in the MEMORY BUSY functional logical subsection 316, are transistor transistor logic (TTL) compatible signals. The logic "0", or Low, condition of signal (L) REQUESTOR INHIBIT on line 304-01 is utilized by the requestor user to inhibit the initiation of new request to memory, during the wakeup period after powerup. Continuing in the REFRESF TIMING functional logical subsection 304 with the setting of the refresh request JK FF 304-02, such JK FF 304-02 is clocked by the signal arising in the oscillator OSC 304-22, such as is of 1.24 megahertz frequency. Such signal may be dropped across a resistor R304-08, of appropriate value, zero ohms for card test, before being supplied to JK FF 304-02 and the 8 BIT SHF RGTR 304-10. The 1.024 megahertz clock signal arising in OSC 304-22 is supplied to clock the 8 BIT SHF RGTOR 304-10, industry standard part no. 54LS164. The interconnection of the most significant bit signal output therefrom such 8 BIT SHF RGTR 304-10 to INVERTOR 304-12, industry standard part no. 54LS04, and then back as the least significant, A0, bit input thereof such 8 BIT SHF RGTR 304-10 will serve to have such shift register function as a counter of 16 clock pulses. When the most significant, Q7, bit output therefrom the 8 BIT SHF RGTR 304-10 as inverted in INVERTOR 304-12, in combination with the next to most significant, Q6, bit signal output of the 8-BIT SHF RGTR 304-10, are both supplied to 2-input gate, industry standard part no. 54F02, then the satisfaction thereof such 2-input NOR gate 304-14 will produce a High J side signal input to the dual edge-triggered JK flip-flop JK FF 304-02, industry standard part no. 54LS112. Such flip-flop will thus set, providing Low output signal (L)REFRESH REQUEST on line 304-07 every 16 clock cycles (approximately every 16 microseconds) forbearing the intervening occurrence of an advance memory read. The effect of such an advance memory read may be observed in the signal (L) ADV DATA TO BUS on line 306-09 which clears the 8 BIT SHF RGTR 304-10. If only one such advance read occurs each 16 clock cycles, approximately 16 microseconds, then the refresh request flip-flop JK FF 304-02 will not become set, and the refresh timing of the dynamic random access memory will be completely within the shadow of, or behind, the operation of the present memory to supply advance read words to user addressing such advance read words.

Also shown in the REFRESH TIMING functional logical subsection 304, either the Low condition of signal (L) USER REQUEST on line 302-15, such as indicates a user request pending, or the Low condition of signal (L) REFRESH REQUEST on line 304-07 which indicates a refresh request pending, or the Low condition of signal (L)T15 on line 308-21 which is a timing signal, will satisfy triple 3-input AND gate 304-16, industry standard part no. 74F10. The clearing of the refresh request flip-flop JK FF 304-02 arises from the Low condition of signal (H)REF CYCLE.T16 on line 304-05 is developed as the combination of signal (H) REFRESH CYCLE on line 306-11 and signal (H) T12.T16 on line 308-09 in 2-input AND gate 304-18, industry standard part no. 54LS00, as inverted in INVERTOR 304-20, industry standard part no. 54LS04.

Continuing with the explanation of the detail control logic, the ADVANCE READ functional logical subsection 306 is shown in FIG. 3c. The four D-TYPE FF's (edge-triggered flip-flops) 306-02, 306-04, 306-06 and 306-08, are industry standard part no. 54F74. The two 0-FF's 306-02, and 306-04 are held in the set condition, until the signal (H)ADVANCE DATA LATCHED on line 318-03 is set active High, disabling the Advance Read Cycle. When a Sequential User Request to an even address occurs the next odd address data word is latched in the ADVANCE DATA OUTPUT REG. 228 in FIG. 1, and the (H)ADVANCE DATA LATCHED signal line 318-03 is set active High. The signal (H)ADVANCE DATA LATCHED on line 318-03, will later be seen to occur at the end of an advance read cycle, as clocked by the High occurrence of signal (H)T1 on line 308-23. Considering the satisfaction of triple (3) input NAND gate 306-10 in the development of the Low, or true signal (L)ADV READ on line 306-07, such NAND gate receives the clear side signal outputs from D-TYPE FF's 306-02 and 306-04, and the set side signal output from D-TYPE FF 306-08. The D-TYPE FF's 306-02 and 306-04 are respectively cleared, producing a High clear side signal output therefrom, by the respective Low occurrences of signal (L) ADVANCE READ UPPER on line 210-01 and (L)ADVANCE READ LOWER on line 212-01, which signals respectively arise at UPPER COMPARATOR 210 and LOWER COMPARATOR 212 (shown in FIG. 2a), and which signals are Low when the current memory address is detected to be equal with the previously stored advance read address. The D-TYPE FF 306-08 is set, producing a High set side signal output therefrom, upon the High occurrence of signal (H)MEM ADDRESS-0 on line 306-13 which signal, derived from the USER MEMORY BUS, will be High when the least significant memory address bit is set, or "1". The conditions of a current memory address which is odd and which is also in equal comparison to the previously stored advance read address thus clears D-TYPE FF's 306-02, 306-04 and sets D-TYPE FF 306-08, producing signal outputs therefrom in satisfaction of 3-input NAND gate 306-10.

Continuing with the ADVANCE READ functional logical subsection 306, the Low signal (L)ADV READ on line 306-07 satisfies 2-input NAND gate 306-14, industry standard part no. 54F00, producing High signal (H)REFRESH CYCLE on line 306-11 to be output therefrom. Also allowing satisfaction of this NAND gate 306-14 is the Low condition of signal (H)ENA MEM BUSY on line 306-01, such signal as will arise when the D-TYPE FF 306-06 has been cleared upon the occurrence of the Low condition of signal (H)USER REQUEST on line 302-13. Thus when either the present memory is not selected, represented by the Low condition of signal (H) USER REQUEST on line 302-13, and is resultantly not enabled to become busy, represented by the Low condition of signal (H)ENA MEM BUSY on line 306-01, or else the present memory is enabled for an advance read cycle, represented by the Low condition of signal (L)ADV READ on line 306-07, then 2-input NAND gate 306-14 will be satisfied producing Low signal (L)REFRESH CYCLE on line 306-11 in enablement of a refresh cycle. Conversely, if the present memory is both requested and enabled to be busy, represented by the High condition of signal (H)ENA MEM BUSY on line 306-01, and an advance read enablement is not recognized which is represented by the High condition of signal (L)ADV READ on line 306-07, then 2-input AND gate 306-16 industry standard part no. 74F08 will be satisfied producing High signal (H)USER REQUEST CYCLE on line 306-13. Such condition—that a user request cycle should be initiated—is obviously the case when the present memory is selected and made busy but is not able to respond with an advance, read-ahead, data word. This signal (H)USER REQUEST CYCLE on line 306-13 is distributed to EVEN ADDRESS MUX 220 and ODD ADDRESS MUX 222 (shown in FIG. 2b).

Continuing in explanation of the ADVANCE READ functional logical subsection 306, upon the third, and final, combination of conditions of utilization the present memory is requested and active, represented by the set condition of the D-TYPE FF 306-06 and a Low clear side signal output therefrom, while and advance read operation is enabled represented by Low signal (L)ADV READ on line 306-07. Such two Low signals, representing a requested memory enabled for the supply of an advance, read-ahead, data word, satisfies 2-input NOR gate 306-12, industry standard part no. 74F02, and produces a High signal output therefrom into each side of the dual 2-wide 2-input AND/OR/INVERTOR circuit 306-18, industry standard part no. 54F51. Such dual 2-wide 2-input AND/OR/INVERTOR gate 306-18 is satisfied during either the High occurrence of signal (H)T2 on line 308-29 or signal (H)T8 on line 308-03, which signals arise from the TIMING CHAIN subsection 308. Satisfaction of the AND/OR/INVERTOR 306-18 produces Low signal (L)ADV DATA TO BUS on line 306-09, such signal as is supplied to the ADVANCE DATA OUTPUT REG 228 (shown in FIG. 2c) and enables the gating of data from such register to the USER MEMORY BUS 201.

Continuing with the explanation of the detailed control logic shown in FIG. 3, the TIMING CHAIN functional logical subsection 308 is shown in FIG. 3d-a, 3d-b, and FIG. 3d-c. The TIMING CHAIN is built in 4-bit latches from periodic signals derived from a (gross) DELAY line 308-04, a 50 nanosecond delay line in five second increments comprised of industry standard part no. LF10K10, and, for fine tuning, a 10 NS DELAY line 308-06: a ten nanosecond delay line with one nanosecond incremental taps industry standard part no. LF10DA. During the normally High condition of signal (L)PWR MCLR on line 302-03, and the High condition arising from tap 2 of the 10 NS DELAY line 308-06, the dual 4-input position and/or LINE DRIVER 308-02 will be satisfied by the High occurrence of signal (H)ACTIVE on line 304-03, which signal represents the user request of the present memory unit. The resultant Low signal output therefrom such LINE DRIVER 308-02 is fed in at the five nanosecond tap of the DELAY line 308-04 and, after passing through a resistive termination for noise improvement, into the IN input of such DELAY line 308-04. Thus the five nanosecond tap upon the DELAY line 308-04 may be considered the beginning, or $T_o$ time. The signal (L)T ODD which is resultant from LINE DRIVER 308-02, and the inversion of such signal in the INVERTOR 306-08, industry standard part no. 54F04, to produce signal (H)T ODD will be utilized to clock the odd timing pulses. The signal derived from the thirty nanosecond tap of the DELAY line 308-04, a signal thus at $T_o+25$ nanoseconds, and additionally the inversion of said signal in INVERTOR 308-10, industry standard part no. 54F04 are utilized to clock the even timing pulses. Before considering the production of such timing pulses in the 4-bit latches, the interconnection of the delay line will be completed. The fifty nanosecond tap or $T_o+45$ nanoseconds of the gross DELAY line 308-04 is routed to the IN input of the fine tuning 10 NS DELAY line 308-06. Nominally, the two nanosecond delay tap 2 of such 10 NS DELAY line 308-06, thus at a net time of $T_o+47$ nanoseconds, is routed through a resistor back to the LINE DRIVER 308-02. Since such LINE DRIVER 308-02. Since such LINE DRIVER 308-02 has an approximate 3 nanosecond internal delay, the net return of the output signal therefrom to the gross DELAY LINE 308-04 is at a total periodicity of 50 nanoseconds. Thus the coarse and fine delay lines cycle at a period of 50 nanoseconds, with signal (H)T ODD output from INVERTOR 308-08, and signal (H)T EVEN Output from INVERTOR 308-010 being at a time separation of 25 nanoseconds. The resistances connected to the 10 nanosecond tap of 10 NS DELAY line 308-06 are merely for noise improvement.

Continuing in the discussion of TIMING CHAIN functional logical subsection 308, then FOUR-BIT LATCHes 308-12 and 308-18, which latches are quad D-type flip-flops industry standard part no. 54S175, are interconnected in production of the even numbered pulses of the timing chain, signal (H)T2 on line 308-29 through signal (H)T16 on line 308-07. Likewise, the FOUR-BIT LATCHes 308-14 and 308-16, actually quad D-type flip-flops industry standard part no. 54S175, are interconnected in the production of the odd numbered pulses of the timing chain, signals (L)T3 on line 308-13 through signal (L)T15 on line 308-21. Of note, signal (L)T15 on line 308-21 was used in the REFRESH TIMING functional logical subsection 304 in satisfaction of 3-input OR gate 304-16 in the maintenance of High signal (H)ACTIVE on line 304-03, thereby keeping the request active. The combination of the clear side QO signal output of FOUR-BIT LATCH 308-12, the signal which would be (L)T16, and signal (L)T12 on line 308-05 in 2-input NOR GATE 308-0 industry standard part number 74F02 is in generation of composite of timing signal (H)T12.T16 on line 308-09. Similarly, the combination of the set side Q1 signal output of the FOUR-BIT LATCH 308-14, signal (H)T11, with signal (H)T4 on line 308-01 in 2-input NOR gate 308-22, industry standard part no. 74F02, produces composite signal (H)T4.T11 on line 308-11, which signal is supplied to the REFRESH ADDRESS MUX 218 and to the USER ADDRESS MUX 216 (shown in FIG. 2b). Similarly, signal (H)T4 on line 308-01 is supplied to ODD DATA INPUT REG. 224 and EVEN DATA INPUT REG. 232 (shown in FIG. 2). Similarly, signal (H)T5 on line 308-25 is supplied to ODD DATA OUTPUT REG. 226 and EVEN DATA OUTPUT REG. 234 (shown in FIG. 2). Other timing signals are distributed within the control logic of FIG. 3.

Continuing in the explanation of the TIMING CHAIN functional logical subsection 308, the satisfaction of the JK FF 308-24, industry standard part no. 54F112, serves to illustrate the exact pulse length and pulse relationships of such timing chain. Since the FOUR-BIT LATCHes 308-12, 308-14, 308-16, and 308-18 are receiving a clock (CLK) input each 25 nanoseconds, then the signal (H)T7 on line 308-17 as supplied to 2-input NOR gate 308-26, industry standard part no. 54F02, will be separated in time by 8 times 25 nanoseconds, or 200 nanoseconds, from the Q0 output signal (actually signal (H)T15) of the FOUR-BIT LATCH 308-14, which signal is also supplied to NOR gate 308-26.

Figure 3E:
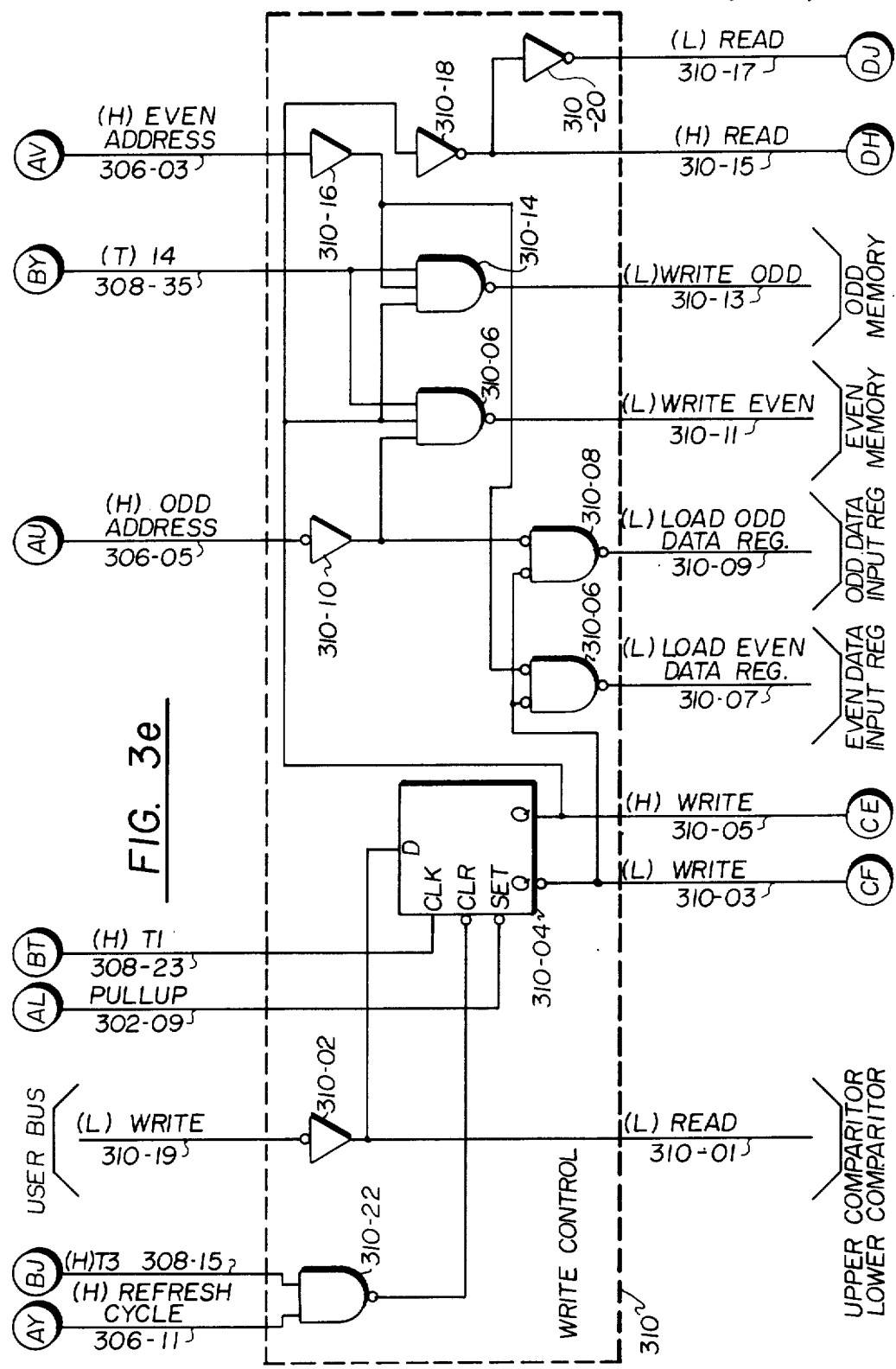

Continuing with the explanation of the detail control logic shown in FIG. 3, the WRITE CONTROL functional logical subsection 310 is shown in FIG. 3e. The signal (L)WRITE on line 310-19 is received on the USER MEMORY BUS 201 and is Low during such time as the present memory is selected to be written. The inversion of such signal (L)WRITE on line 310-10 in INVERTOR 310-02, industry standard part no. 43F04, is supplied as signal (L)READ on line 310-01 to the UPPER COMPARATOR 210 and LOWER COMPARATOR 212 (shown in FIG. 2a.) as that enable signal, Low when enabling, for said comparators. During the constant High level of signal PULLUP on line 302-9, the High occurrence of signal (H)T1 on line 308-23 also clocks such signal (L) READ on line 310-01 to set or clear the D-TYPE FF 310-04, a D-type edge-triggered flip-flop industry standard part no. 54F74. The clear side signal output thereof such D-TYPE FF 310-04 is supplied as signal (L)WRITE on line 310-03, a Low signal if write is enabled, to 2-input OR gates 310-06 and 310-08, industry standard part no. 54F32. Either signal (H)ODD ADDRESS on line 306-05 or signal (H)EVEN ADDRESS on line 306-03, which signals were seen to be derived from the respective set and clear sides of the D-TYPE FF 306-08 previously seen in the ADVANCE READ functional logical subsection 306, will be High. The inversion of such respective signals (H)ODD ADDRESS on line 306-05 and (H)EVEN ADDRESS on line 306-03 in respective INVERTORS 310-10 and 310-16, industry standard part no. 54F04, will be respectively supplied or OR gates 310-08 and 310-06. During the write operation, one of such OR gates 310-06 or 310-08 will be satisfied, producing Low signal (L)LOAD EVEN DATA REG on line 310-07 or Low signal (L)LOAD ODD DATA REG on line 310-09 dependent upon whether the address to be written is even or odd. Such signal (L)LOAD EVEN DATA REG on line 310-07 and such signal (L)LOAD ODD DATA REG on line 310-09 are respectively supplied to the EVEN DATA INPUT REG. 32 (shown in FIG. 2d) and the ODD DATA OUTPUT REG 26 (shown in FIG. 2c).

Continuing in the WRITE CONTROL functional logical subsection 310, the signal (H) WRITE on line 310-05 arising at D-TYPE FF 310-04 is first inverted in INVERTOR 310-18, industry standard part no. 54F04, in production of signal (H)READ on line 310-15, and again inverted in INVERTOR 310-20, industry standard part no. 54F40, in production of signal (L)READ on line 310-17. The labelling, and the representative High or Low signal levels when true, of such signals is merely representative of the fact that when the present memory is not enabled for a write, then it is enabled for a read, and vice-versa. The signal (H)WRITE on line 310-05, High when a write is enabled, is also supplied to 3-input NAND gates 310-12 and 310-14, industry standard part no. 74F10. One of these NAND gates, NAND gate 310-12 for the case of even addresses, or NAND gate 310-14 for the case of odd addresses, will be gated upon the High occurrence of timing signal (H)T14 on line 308-35 during the presence of a High signal respectively output from either INVERTOR 310-10 or INVERTOR 310-16 dependently upon whether the present address to be written is respectively even or odd. The signal (L) WRITE EVEN on line 310-11 Low when the even memory store is to be written, is supplied to the EVEN MEMORY 65K × 16 236 (shown in FIG. 2d). The signal (L) WRITE ODD on line 310-13, alternatively Low when the odd memory store is to be written, is supplied to the ODD MEMORY 65K × 16 230 (shown in FIG. 2c).

Figure 3I:
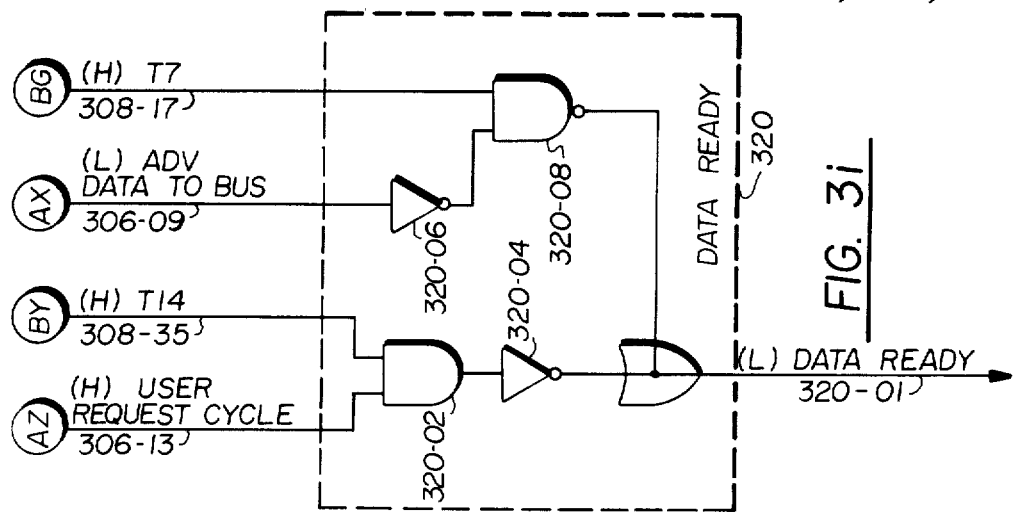
Figure 3F:
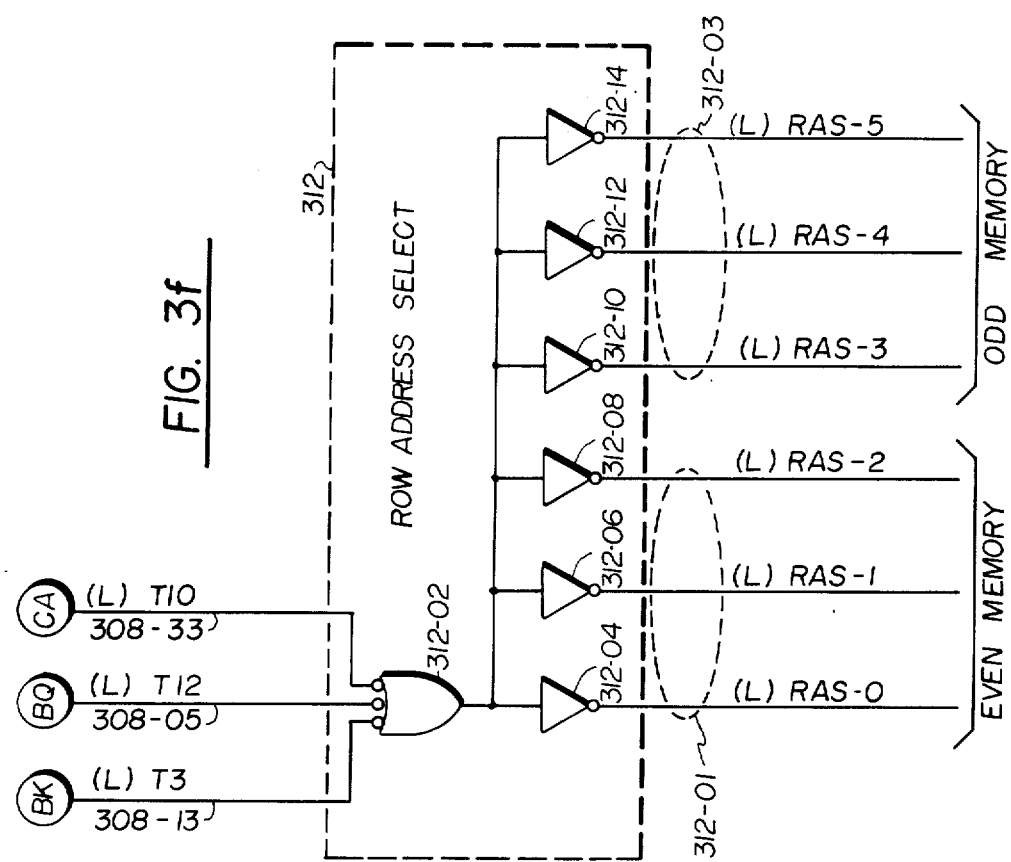

Continuing with the explanation of the detail control logics shown in FIG. 3, the ROW ADDRESS SELECT functional logical subsection 312 is shown in FIG. 3f. The row address select signals, which are signals applied in the addressing of dynamic read only address memories, are formulated as either the Low condition of signal (L)T3 on line 308-13, signal (L)T12 on line 308-05 or signal (L)T10 on line 308-33 as are received into triple 3-input NAND gate 312-02, industry standard part no. 74F10. During the Low condition of any of these timing signals as received at NAND gate 312-02, the High signal output therefrom such NAND gate 312-02 will be inverted and amplified in INVERTERs 312-04, 312-06, and 312-08, all industry standard part no. 54S04, and applied to EVEN MEMORY 65K × 16 236 (shown in FIG. 2d) as signal (L)RAS-0 through (L)RAS-2 on cable 312-01. Similarly, the High signal output of NAND gate 312-02 is inverted and amplified in INVERTERs 312-10, 312-12 and 312-14, likewise industry standard part no. 54S04, and applied to ODD MEMORY 65K × 16 230 (shown in FIG. 2c) as signal (L) RAS-3 through (L) RAS-5 on cable 312-03 during the row address selection of such dynamic random address memory.

Continuing in FIG. 3, the development of the column address selection signals in COLUMN ADDRESS SELECT functional logical subsection 314 is principally derived from basic timing pulses. Either the Low condition of signal (L)T11 on line 308-19 or signal (L)T6 on line 308-31 can satisfy two-input NAND gate 314-02, industry standard part no. 54F00, and with the High output signal resultant therefrom, produces a High signal into one side of the dual 2-wide 2-input AND/OR/INVERTOR circuit 314-04, industry standard part no. 54S51, during the High condition of signal (L)WRITE on line 310-03. Alternatively to the High condition of signal (L)WRITE on line 310-03 indicating a read operation is transpiring, the High condition of signal (H)WRITE on line 310-05 can satisfy the other side of the dual 2-wide 2-input AND/OR/INVERTOR circuit 314-04 during the High occurrence of signal (H)T16 on line 308-07. By whatsoever means, and during whatsoever time period, AND/OR/INVERTOR gate 314-04 is satisfied, the Low signal output therefrom may be amplified in non-inverting drivers 314-06 through 314-12, which drivers are actually 2-input OR gates with one input thereof tied to ground and are comprised of industry standard part no. 54S32. The signal (L)CAS-0 and (L)CAS-1 on cable 314-01 developed in these OR-gates-used-as-non-inverting-drivers E314-06 and 314-08 is supplied to EVEN MEMORY BUS 65K×16 236 (shown in FIG. 2d). The signal (L)CAS-2 and (L)CAS-3 on cable 314-03 as produced in these OR-gates-utilized-as-non-inverting-drivers 314-10 and 314-12 is supplied to ODD MEMORY 65K×16 230 (shown in FIG. 2c).

Figure 3G:
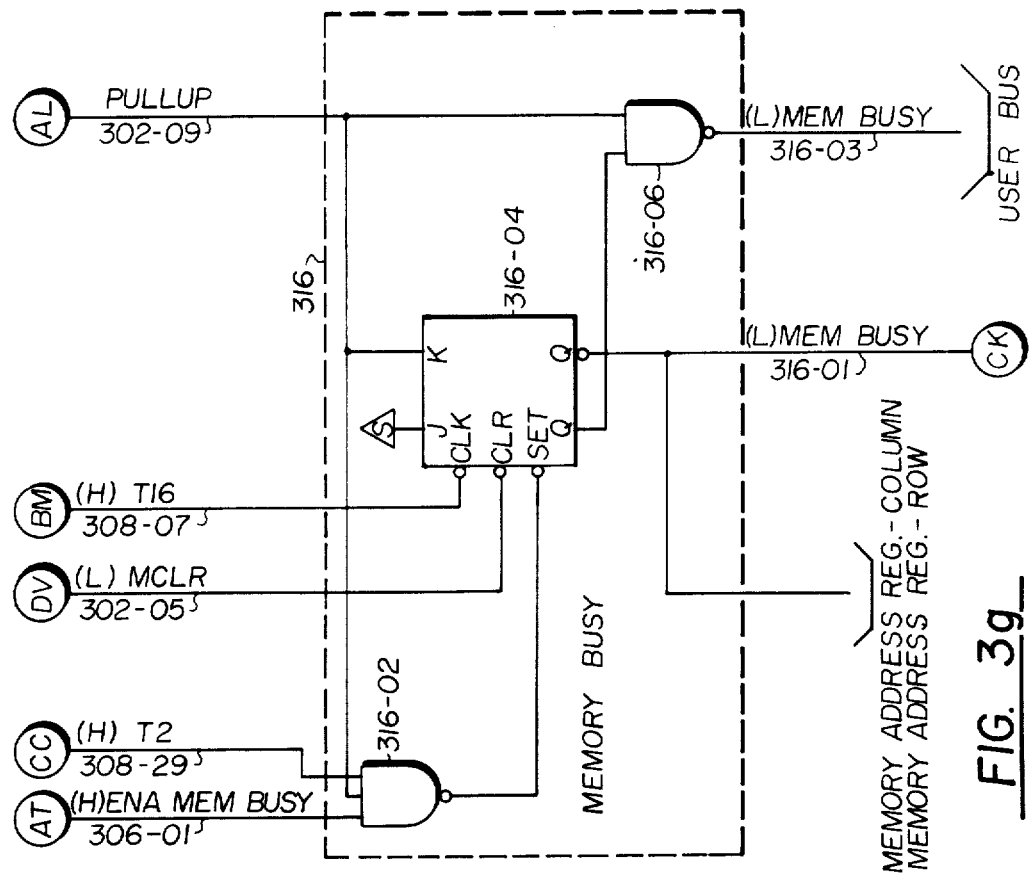
Figure 3G:
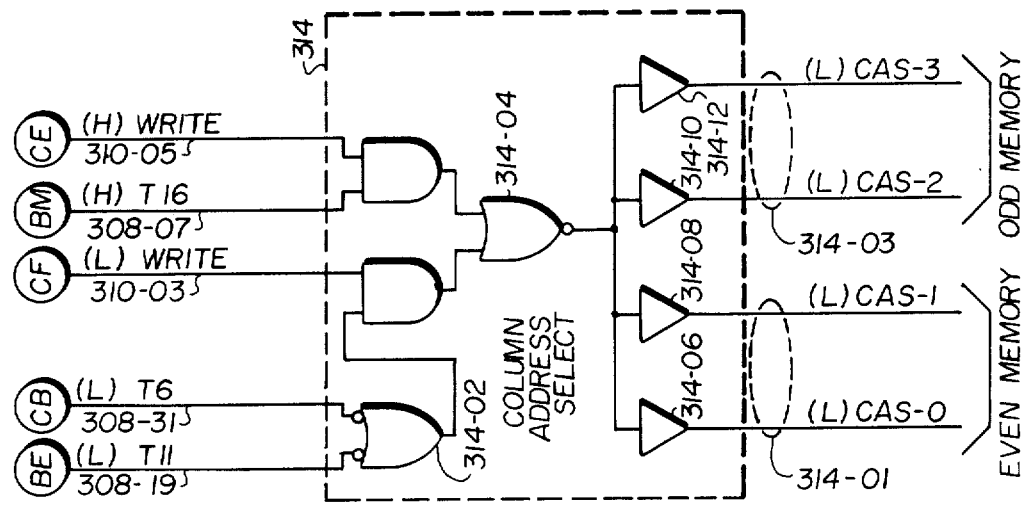

Continuing in FIG. 3, the detail logics in implementation of the MEMORY BUSY functional logical subsection 316 are shown in FIG. 3g. The High occurrence of signal (H)ENA MEM BUSY on line 306-01, previously seen to have been developed in the ADVANCE READ functional logical subsection 306 responsive to a user request, does, in the presence of always High signal PULLUP on line 302-09 and during the High occurrence of signal (H)T2 on line 308-29, satisfy 3-input NAND gate 316-02, industry standard part no. 74F10. The Low signal output therefrom such NAND gate 316-02 does enable the setting of dual J-K edge-triggered flip-flop JK FF 316-04. During the time that the memory is busy, the Low clear side signal output thereof such JK FF 316-04 is distributed as signal (L)MEM BUSY on line 316-01, which was previously observed to clock the MEMORY ADDRESS REG.-COLUMN 202 and the MEMORY ADDRESS REG.-ROW 204 (both shown FIG. 2a). The High set side signal output thereof such JK FF 316-04 does enable, in the High presence of signal PULLUP on line 302-09, the 2-input NAND buffer with open collector output 316-06, industry standard part no. 5438. The signal output thereof such buffer 316-06 is signal (L)MEM BUSY on line 316-03 which is transmitted upon USER MEMORY BUS 201.

Continuing in FIG. 3 with the explanation of the detail control logic of the present invention, a most important feature of the memory of the present invention whereby a user requestor of such memory may identify itself as sequential, thereby enabling for even addresses requested the load of an advance, read-ahead, data word within the ADVANCE DATA OUTPUT REG. 228 (shown in FIG. 2c) or, alternatively, that the user device may not identify itself as sequential and may thereby not cause any disturbance to contents previously stored within such ADVANCE DATA OUTPUT REG. 228, is shown in the ADVANCE READ/BUS ENABLE functional logical subsection 318. Signal (H)SEQUENTIAL USER on line 318-09, which signal is received upon the USER MEMORY BUS 201, is the user controlled signal which selectively enables the advance read function of the memory of the present invention. This signal (H)SEQUENTIAL USER on line 318-09 is also tied to the +5 v.d.c. supply voltage through a current limiting resistor so that the signal (H)SEQUENTIAL USER will be high, continuously enabling the advance read-ahead feature of the present memory, should such signal input not be physically connected in general, or should such signal fail to be connected to any particular one(s) user device(s). During the High occurrence of signal (H)USER REQUEST CYCLE on line 306-13, signal (H)READ on line 310-15, and signal (H)EVEN ADDRESS on line 306-03—such High signal conditions as in conjunction indicate that an advance read operation is enabled— then 4-input positive AND/OR line DRIVER/RECEIVER 318-02, industry standard part no. 54S140, will be satisfied. The Low signal output thereof such satisfied AND/OR line DRIVER/RECEIVER 318-02 suffices to satisfy 2-input NOR gate 318-04, industry standard part no. 54F02, during the Low occurrence of signal (L)T9 on line 308-27. The High signal output produced therefrom the satisfaction of such NOR gate 318-04 is distributed as signal (H)ENA ADV READ LATCH on line 318-01 to ADVANCE READ ADDRESS REG.UPPER 206, ADVANCE READ ADDRESS REG.LOWER 208 (both shown in FIG. 2a), and ADVANCE DATA OUTPUT REG. 228 (shown in FIG. 2c) to respectively clock and enable such registers. The Low signal output from element 318-02 is also inverted in INVERTOR 318-06, industry standard part no. 54LS04, and used as the J input to the dual J-K edge-triggered flip-flop JK FF 318-08. Such JK FF 318-08 is clocked by the Low occurrence of signal (H)T16 on line 308-07, producing as a set side signal output therefrom the High signal (H)ADVANCE DATA LATCHED on line 318-03 during an advance data read operation. Such JK FF 318-08 is precluded from elsewise setting by the High condition of signal PULLUP on line 302-09 as applied to the SET input thereof, and is cleared by the Low occurrence of signal (H) READ on line 310-15.

Also shown in the ADVANCE READ/BUS ENABLE functional logical subsection 318 is the production of signal (L)ODD DATA TO BUS on line 318-05 and (L)EVEN DATA TO BUS on line 318-07, which signals are respectively distributed to the ODD DATA OUTPUT REG. 226 (shown in FIG. 2c) and even data output reg. 234 (shown in FIG. 2d), in the 4-input mutiplexor QUAD MUX 318-12, industry standard part no. 54F158. The enablement signal to such QUAD MUX 318-12 is signal (L)MEM BUSY on line 316-01, Low when enabling, while the selection signal to such QUAD MUX 318-12 is signal (H) EVEN ADDRESS on line 306-03. In the production of signal (L)EVEN DATA TO BUS on line 318-07 either the ground, or Low, signal applied to QUAD MUX 318-12 input for A0, or the signal (H)READ on line 310-15 applied to input A1 of such QUAD MUX 318-12 is selected. For the development of signal (L)ODD DATA TO BUS on line 318-05, however, the possibility that the data is resultant from an advance read operation must be considered. This possiblity is satisfied by the combination of signal (H)READ on line 310-15 and (L)ADV READ on line 306-07 in 2-input AND gate 318-10, industry standard part no. 54F08.

Concluding in the explanation of the detail control logics of the multi-user read-ahead memory of the present invention as are shown in FIG. 3, the DATA READY functional logical subsection 320 is shown in FIG. 3i. The Low condition of transistor transistor logic (TTL) compatible signal (L)DATA READY on line 320-01 indicates that the memory has accepted the input line during a write cycle or that the data output lines are valid during a read cycle. Such signal is distributed to the user requestor device upon the USER MEMORY BUS 201. The true, or Low, condition of signal (L)DATA READY on line 320-01 may first be formed as the combination of logically High signal (H)USER REQUEST CYCLE on line 306-13 during the High occurrence of timing signal (H)T14 on line 308-35 as firstly satisfies 2-input AND gate 320-02, industry standard part no. 74F08, with the signal output therefrom inverted in INVERTOR 320-04, industry standard part no. 54F05 with open collector output. Alternatively, the Low condition of signal (L)ADV DATA TO BUS on line 306-09 as inverted in INVERTOR 320-06, industry standard part no. 54F45, will, during the High occurrence fo signal (H)T7 on line 308-17, satisfy 2-input NAND buffer with open collector output NAND gate 320-08, causing Low signal (L) DATA READY on line 320-01 to be output therefrom.

Figure 4C:
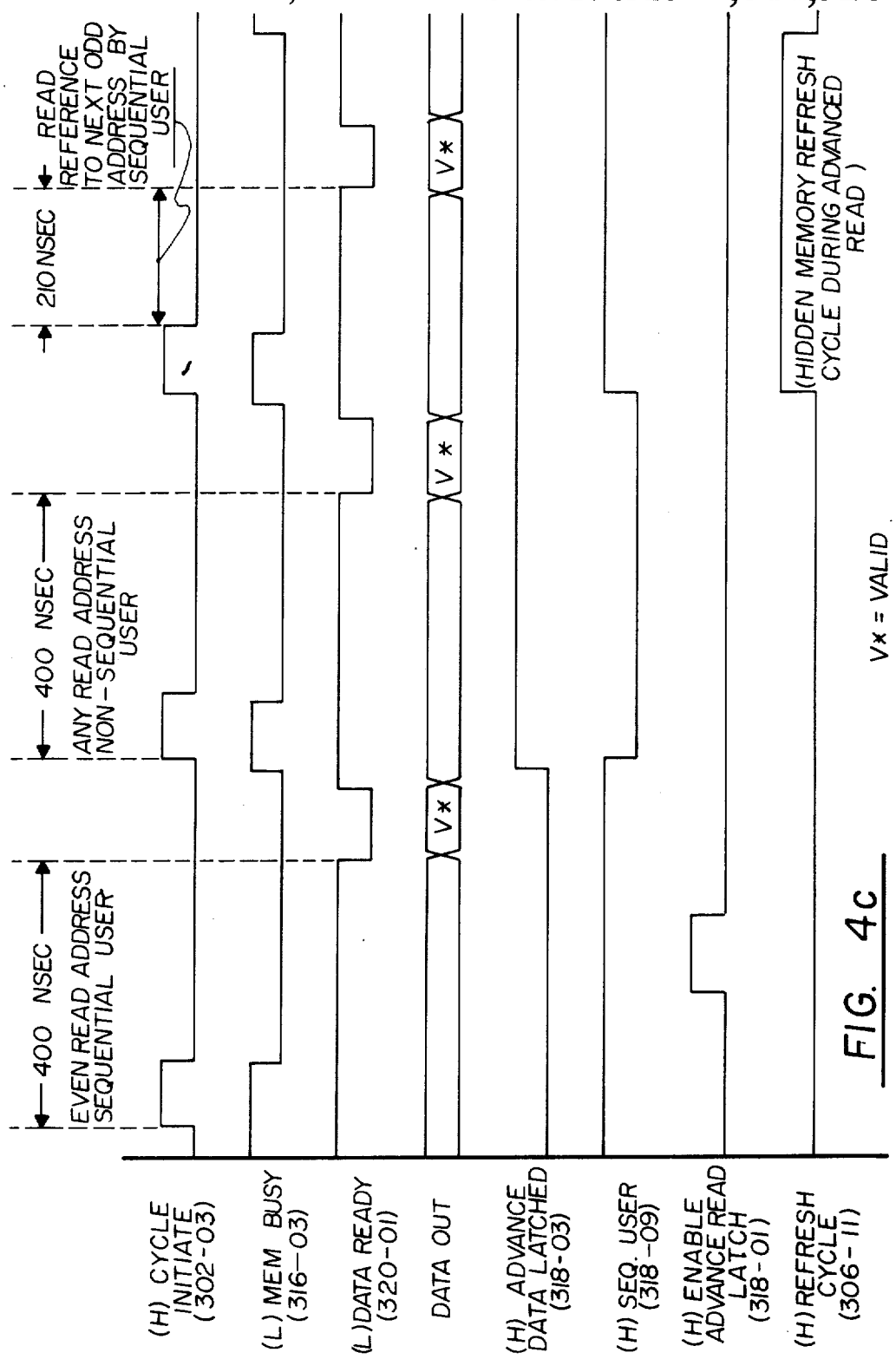
FIG. 4 comprised of FIGS. 4a through FIG. 4c show the timing of the performance of the memory of the present invention for various combinations of references by sequential and non-sequential requestors which do and do not reference read-ahead, prefetched, data words.

The timing diagram of the utilization of the present multi-user read-ahead memory by both sequential and non-sequential users, and during the case of normal memory read cycles versus the supply of an advance read-ahead data word, are shown in FIG. 4, consisting of FIG. 4a through FIG. 4c. The timing of the present memory if the advance data read-ahead feature were not available, or the timing of the memory of the preferred embodiment of the invention when referenced by a non-sequential user (i.e., a user not raising the High condition of signal (H)SEQUENTIAL USER on line 318-09 as shown in FIG. 3a) and also not (fortuituously) encountering upon the reading of an odd address a read-ahead data word caused to be retrieved by a sequential user of such preferred embodiment memory, is shown in FIG. 4a. Two memory cycles upon which the requestor user reads first an even address and then a next sequential odd address are shown. Both cycles function with equivalent timing, indicated to be four hundred nanoseconds from the High-going leading edge of signal (H)CYCLE INITIATE on line 302-23 to the Low-going leading edge of pulse (L) DATA READY on line 320-01.

Figure 3H:
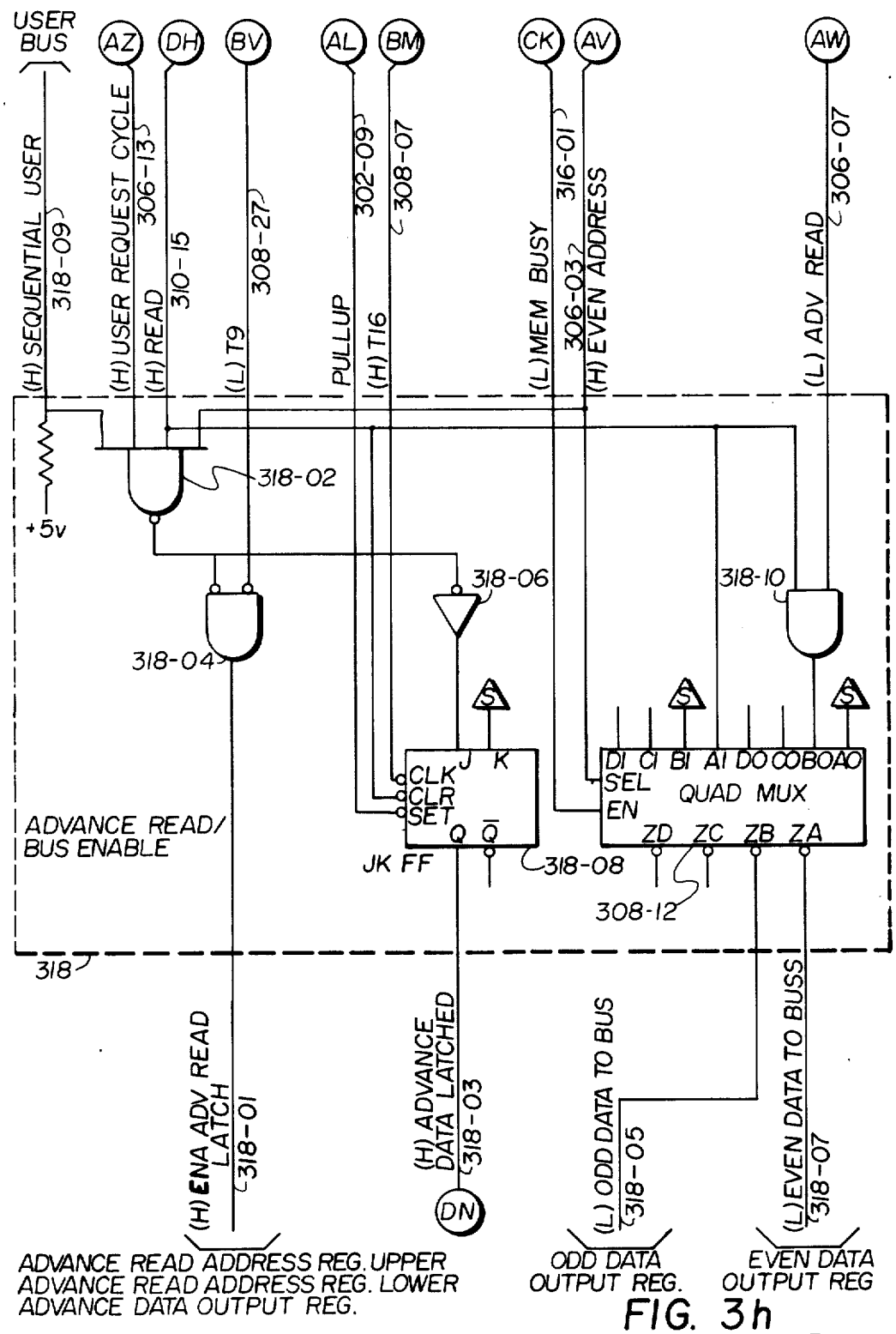

Continuing with the explanation of the timing diagrams of the memory of the present invention as shown in FIG. 4, the response of such memory to provide an advance read-ahead data word to sequential user is shown in FIG. 4b. A memory request to an even address, illustrated as requiring 400 nanoseconds, is taken by a requestor user also identifying itself as sequential by the raising of High signal (H)SEQUENTIAL USER on line 318-09 as shown in FIG. 3h. Responsively to the High occurrence to signal (H)CYCLE INITIATE on line 302-23, the memory causes signal (L)MEM BUSY on line 316-03 to go Low during the memory cycle, which concludes with the Low condition of signal (L)DATA READY on line 320-01 and the implacement of the read data upon the data output lines. Since this request was requested to be of an even address by a sequential user, signal (H)ENABLE ADVANCE READ LATCH on line 318-01 became logically High during the memory cycle and ultimately the advance read data was latched (ultimately under) the control of High signal (H) ADVANCE DATA LATCH on line 318-03. Upon the next subsequent request to memory, by any requestor including that sequential user which had just requested the even address, the next sequential odd address is referenced. This address is detected to be equal to the stored address of the advance read-ahead data word, resulting in Low signal (L)ADV READ on line 306-07 which initiates an advance read cycle, and High signal (H)REFRESH CYCLE on line 306-11 which initiates a memory refresh cycle which is in the background of, or "hidden", behind the supply of a data word supplied from the ADVANCE DATA OUTPUT REG. 228 (ahown in FIG. 2c). As a first object of the present invention shown in the timing diagram of FIG. 4b, it may be noted that the organization of the present memory for the parallel internal reading of both an even and next sequential odd address in even time upon the request to (only) the even address does, without causing any greater time for the reading and supply to a requestor of the data at such even address, enable the advance read-ahead of data from the next sequential odd address to be later supplied to a requestor, should it be requested, in reduced time. This time saving is noted to be 190 nanoseconds, or nearly 50%, in the preferred embodiment of the present invention. Furthermore, a second objective of the present memory—that a refresh cycle may be hidden during the occurrence of the supply of an advance-read data word—is also shown in FIG. 4b.

Continuing with the explanation of the timing diagram of the operation of the multi-user read-ahead memory of the present invention as shown in FIG. 4, the object of such invention that non-sequential users should not adversely affect the advance read function of such memory to sequential users is shown in FIG. 4c. The scenario shown in FIG. 4c is that of a request to an even address by a sequential user, an intervening request to any address (even or odd) by a non-sequential user, and a subsequent request by a sequential user (most normally the most probably that sequential user which did originally first register the request to an even address) to the next sequential odd address to that first-read even address. Upon each successive request to memory, a user is identified as either sequential or non-sequential dependent upon whether it raises the respective High, or holds Low, the signal (H)SEQUENTIAL USER on line 318-09. It may be observed in FIG. 4c that the intervening non-sequential user as did make read request to any address, did hold signal (H)SEQUENTIAL USER on line 318-09 Low, indicating that it is not a sequential user. Thusly, even should such non-sequential user have read an even address, signal (H)ENABLE ADVANCE READ LATCH on line 318-01 will not go logically High and there will be no disturbance of either the advance read address stored within ADVANCE READ ADDRESS REG.UPPER 206 and ADVANCE READ ADDRESS REG.-LOWER 208 (shown in FIG. 2a) nor of the advance read data stored within the ADVANCE DATA OUTPUT REG. 228 (shown in FIG. 2c). When the next subsequent read reference is made to that next subsequent odd address, which odd address has been stored for comparison, and from which odd address advance read-ahead data word has already been retrieved, then such word may be more expeditiously supplied to the user requestor. Additionally, and as was shown in FIG. 4b, the memory refresh cycle cocurs in time overlap with, or is "hidden" behind, the supply of such advance read data to the requestor user. Dependent upon the total number of users of a multiple number of such users to the present memory, and the propensity of each user to make sequential versus non-sequential references of memory, and the extent to which each user's individual requests are intermixed and intervening, the present invention of a memory which does allow not only the read-ahead of advance data, but does condition the performance of such read-ahead upon whether a requestor does identify itself to be (probablistically) sequential or non-sequential, will generally accord a performance increase within most actual data processing systems.

The preferred embodiment of the present invention is implemented with one only read-ahead address and data register, and one only signal controlling the loading of same. Once the concept has been shown that a user of memory may selectively have data read-ahead without impact upon the time performance of the present request, then it should be a logical extension of the present invention that each of a multiplicity of users could have individually associated storage sites at which the individually associated read-ahead addresses and data words might be stored. Such a creation of hardware associated with each individual requestor user, or at least with such one(s) of all requestors users as are likely to be sequential, is, of course, a more expanded and expensive version of the present invention. Thusly, while the present invention of a multi-user read-ahead memory has been described with reference to the preferred embodiment, it is to be noted that variations such as the above may suggest themselves to those of skill in the art upon the reading of the present specification. It is therefore asserted that the spirit and the scope of the present invention must be interpreted in a broad sense from the following claims.

What is claimed is:

1. A method employed within and by a digital memory unit responsive to requestors which randomly addressably read ones of a multiplicity of data words stored at a like multiplicity of addressable locations therein said memory, said method in order that one or ones of said data words may be made more readily retrievable to a requestor reading said memory unit by having been read-ahead, or prefetched, from a randomly addressable backing memory store to a buffer memory store, said method of prefetching one or ones of data words within a digital memory unit comprising:

receiving in a first register an address of a one of a multiplicity of said locations from a requestor reading said memory;

conditionally IF said address is even, THEN incrementing this even address by one, forming thereby a next sequential odd address, and storing said next sequential odd address in a second register as an advance read address; and first reading from a first randomly addressable backing memory store at said even address a corresponding one, a first one, of said multiplicity of data words, and first transmitting said first one of said multiplicity of data words to said requestor in satisfaction of said reading, plus during the same time with said first reading second reading from a second randomly addressable backing memory store at said next sequential odd address a corresponding one, a second one, of said multiplicity of data words, and storing said second one of said multiplicity of data words in a buffer memory store as advance read-ahead data; ELSE conditionally IF said address is odd, THEN comparing in a comparator said odd address with the advance read address stored within said second register, and IF said odd address and said advance read address are equal THEN second transmitting the advance read-ahead data stored within said buffer memory store to said requestor in satisfaction of said reading ELSE IF said odd address and said advance read address are not equal THEN third reading from said second randomly addressable backing memory store at said odd address a corresponding one, a third one, of said multiplicity of data words, and third transmitting said third one of said multiplicity of data words to said requestor in satisfaction of said reading;

wherein said transmitting of said advance read-ahead data stored within said buffer memory store to said requestor does transpire, when performed upon the occasion of said odd address equalling said advance read address, faster than said third reading and said third transmitting of said third one of said multiplicity of data words from said second randomly addressable backing memory store to said requestor does transpire, when performed upon the occasion of said odd address not equalling said advance read address.

2. The method of prefetching one or ones of data words within a digital memory unit of claim 1 wherein said incrementing, performed conditionally IF said address is even, further comprises:

conditionally IF said requestor supplies said even address received within said first register and also signals that it is a sequential requestor, meaning that prefetching is to be performed, THEN incrementing said even address by one, forming thereby said next sequential odd address, and storing said next sequential odd address in said second register as said advance read address ELSE IF said requestor supplies said even address and also signals that it is a non-sequential requestor, meaning that prefetching is not to be performed, THEN not storing any address, nor disturbing in any way any existing contents within said second register, thereby leaving said any existing contents within said second register as said advance read address;

and wherein said second reading, performed conditionally IF said address is even, further comprises:

conditionally IF said requestor supplies said even address received within said first register and also signals that it is sequential requestor, meaning that prefetching is to be performed, THEN second reading from said second randomly addressable backing memory store at said next sequential odd address said corresponding one, said second one, of said multiplicity of data words, and storing said second one of said multiplicity of data words in said buffer memory store as advance read-ahead data ELSE IF said requestor supplies said even address and also signals that it is a non-sequential requestor, meaning that prefetching is not to be performed, THEN not storing any data word, nor disturbing in any way any existing contents within said buffer memory, thereby leaving any exiting contents within said buffer memory as said advance read-ahead data.

3. The method of prefetching one or ones of data words within a digital memory unit of claim 1 which, simultaneously with said second transmitting performed conditionally IF said address is odd AND IF said odd address and said advance read address are equal, further comprises:

refreshing said first randomly addressable backing memory store and said second randomly addressable backing memory store which are both of the dynamic random address memory type.

4. A memory system comprising:

read address storage means for storing a remotely supplied memory address which controls the reading of a data word from said memory system, output means, first randomly addressable memory means coupled to said read address storage means and to said output means which responds to said memory address if said memory address has a value of N, by reading an addressed data word stored at a first predefined address of said first randomly addressable memory means to said output means, second ramdomly addressable memory means coupled to said read address storage means and to said output means which responds to said memory address if said memory address has a value of $N+1$ by reading an addressed data word stored at a second predefined address of said second randomly addressable memory means, address incrementing and retention means coupled to said read address storage means and to said second randomly addressable memory means for incrementing each memory address N that is stored in said read address storage means by a count of one to an incremented memory address $N+1$, for storing this incremented memory address and for supplying this incremented memory address to said second randomly addressable memory means, temporay storage means coupled to said second randomly addressable memory means for receiving a prefetched data word that is read from the second predefined address of said second randomly addressable memory means that matches the incremented $N+1$ address stored in said address incrementing and retention means, and address comparison means coupled to said address incrementing and retention means, said temporary storage means and said second randomly addressable means for comparing each supplied memory address having a value $N+1$ with the incremented address that is stored in said address incrementing and retention means, for causing said temporary storage means to output a prefetched data word stored in said temporary storage means to said output means when a comparison occurs and for causing said second randomly addressable memory means to output a data word stored at the second predefined address defined by the value $N+1$ to said output means when there is no comparison, wherein for a particular system as defined herein, if N represents an even integer number, then $N+1$ represents the next larger odd integer number, and if N represents an odd integer number, then $N+1$ represents the next larger even integer number.

5. A memory system as claimed in claim 4 wherein said first and second randomly addressable memory means each comprise dynamic memory means and said system comprises refresh means that refreshes both of said randomly addressable memory means during times that said prefetched data words are being output from said temporary storage means.

* * * * *

UNITED STATES PATENT AND TRADEMARK OFFICE
CERTIFICATE OF CORRECTION

PATENT NO. : 4,621,320

DATED : November 4, 1986

INVENTOR(S) : Daniel D. Holste and Lawrence L. Reiners

It is certified that error appears in the above-identified patent and that said Letters Patent is hereby corrected as shown below:

Column 28, line 29, delete "said".

Signed and Sealed this

Twenty-fourth Day of February, 1987

*Attest:*

DONALD J. QUIGG

*Attesting Officer*  *Commissioner of Patents and Trademarks*